Figure 22:
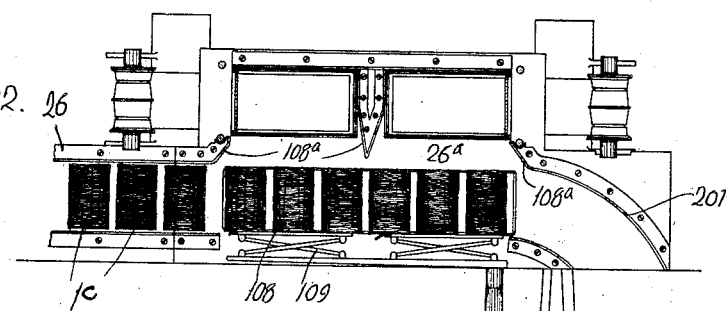

July 13, 1926.
E. P. WEBSTER
1,592,794
MACHINE FOR PACKING BISCUITS
Original Filed Oct. 9, 1922   22 Sheets-Sheet 1
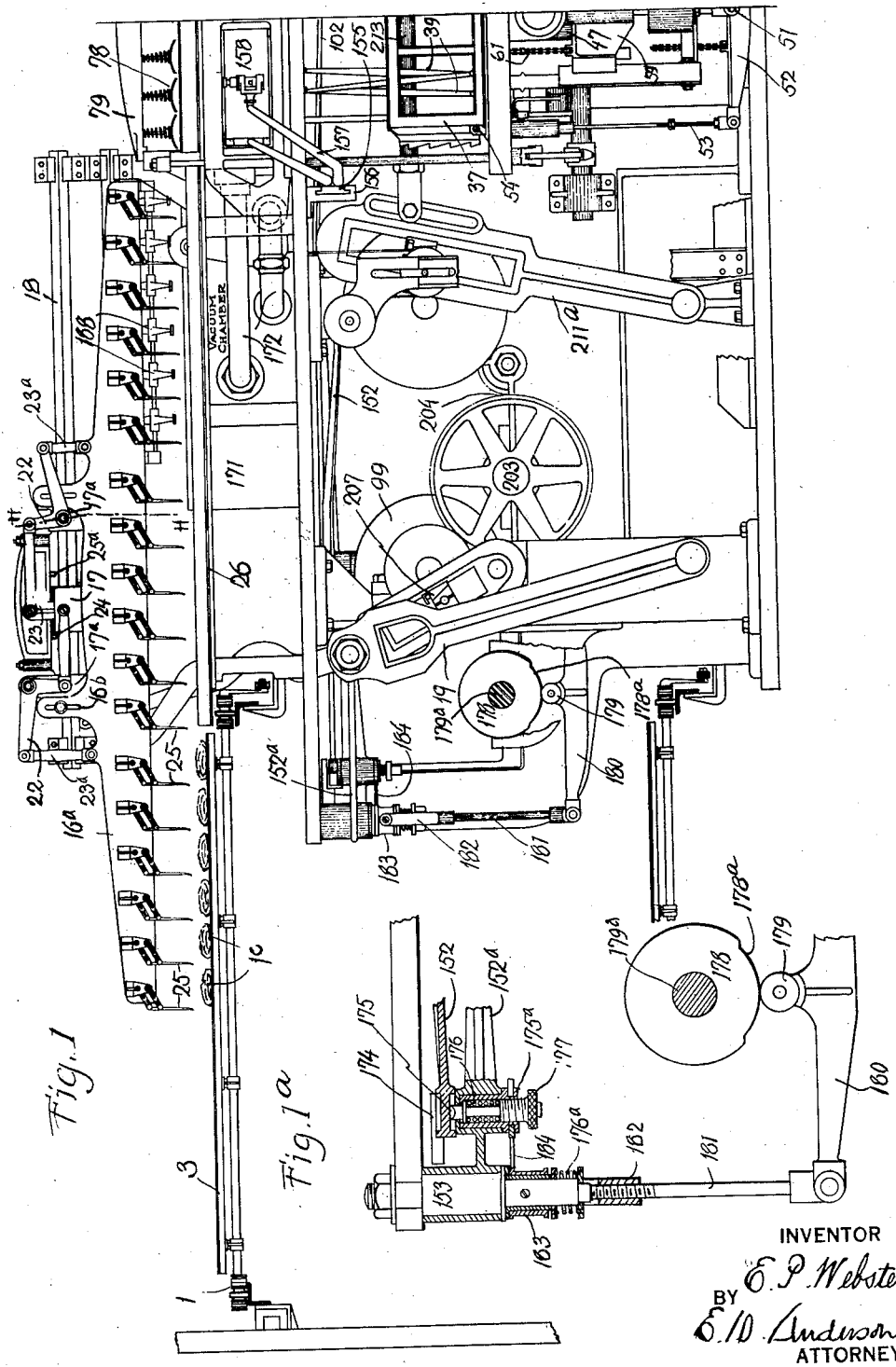
INVENTOR
E. P. Webster.
BY
E. P. Anderson Jr.
ATTORNEY.

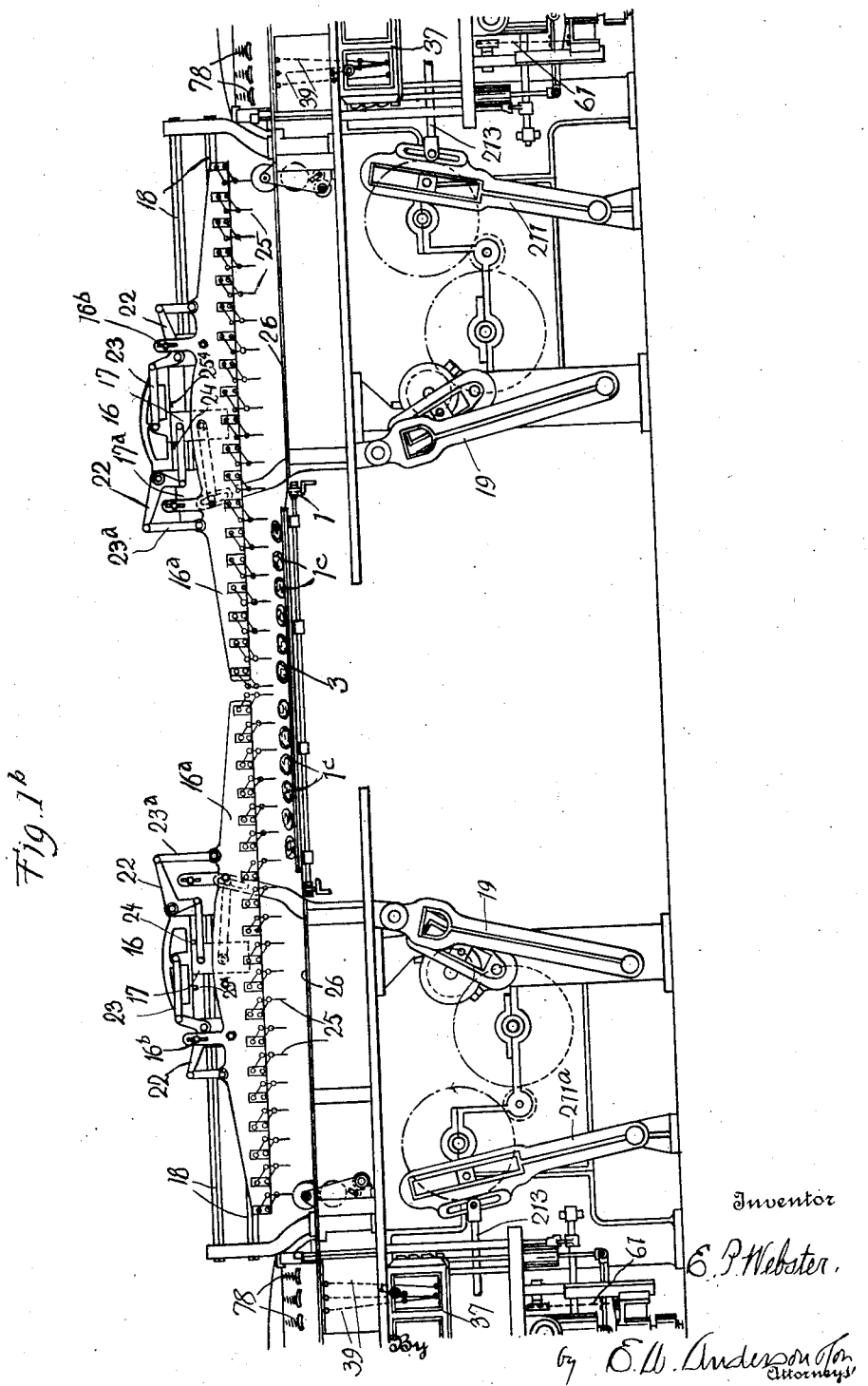

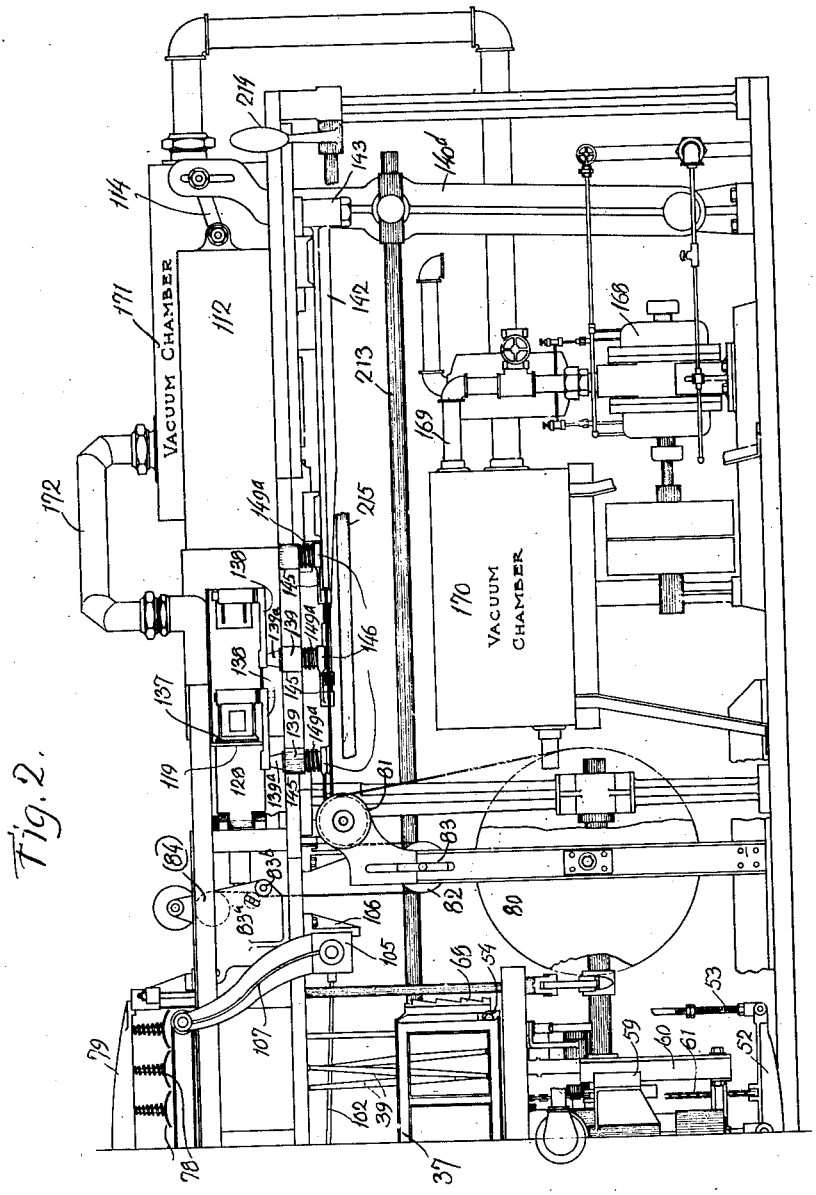

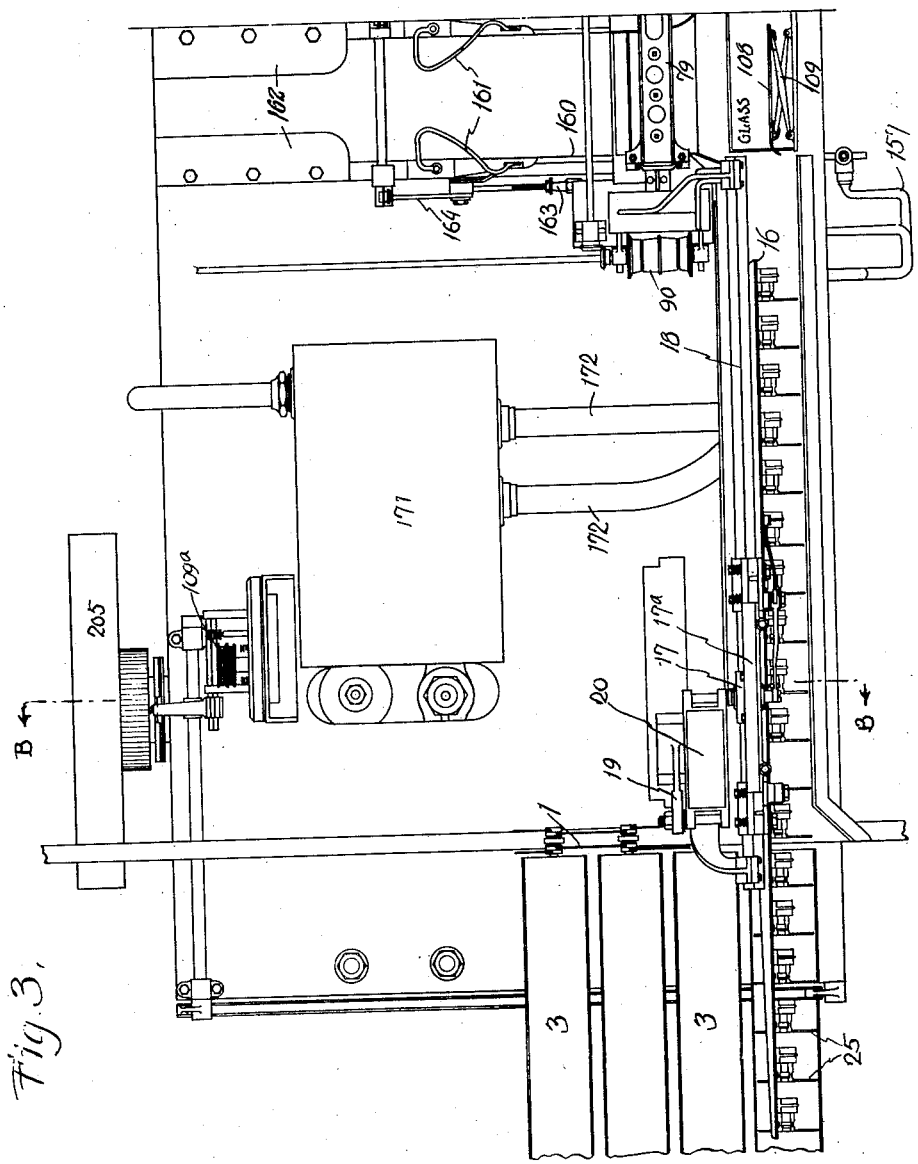

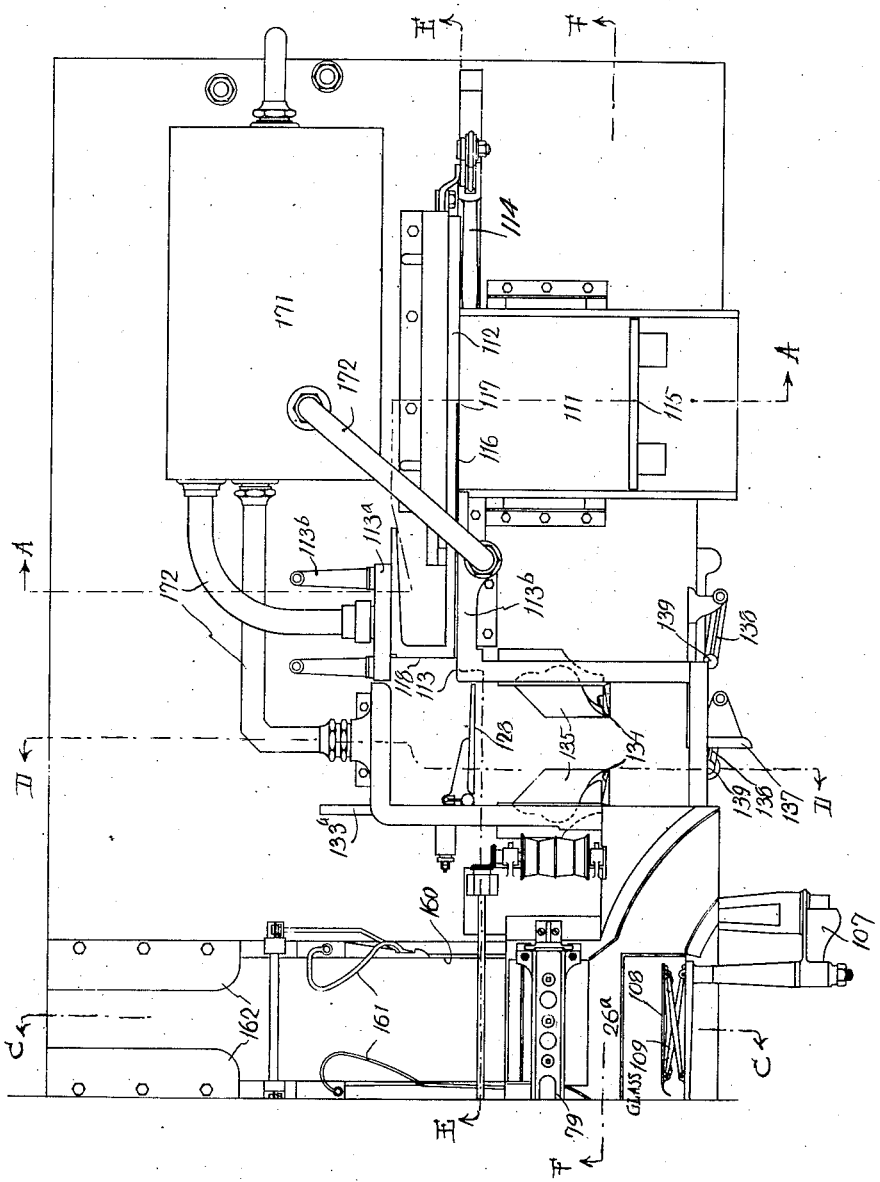

July 13, 1926.
E. P. WEBSTER
1,592,794
MACHINE FOR PACKING BISCUITS
Original Filed Oct. 9, 1922    22 Sheets-Sheet 6
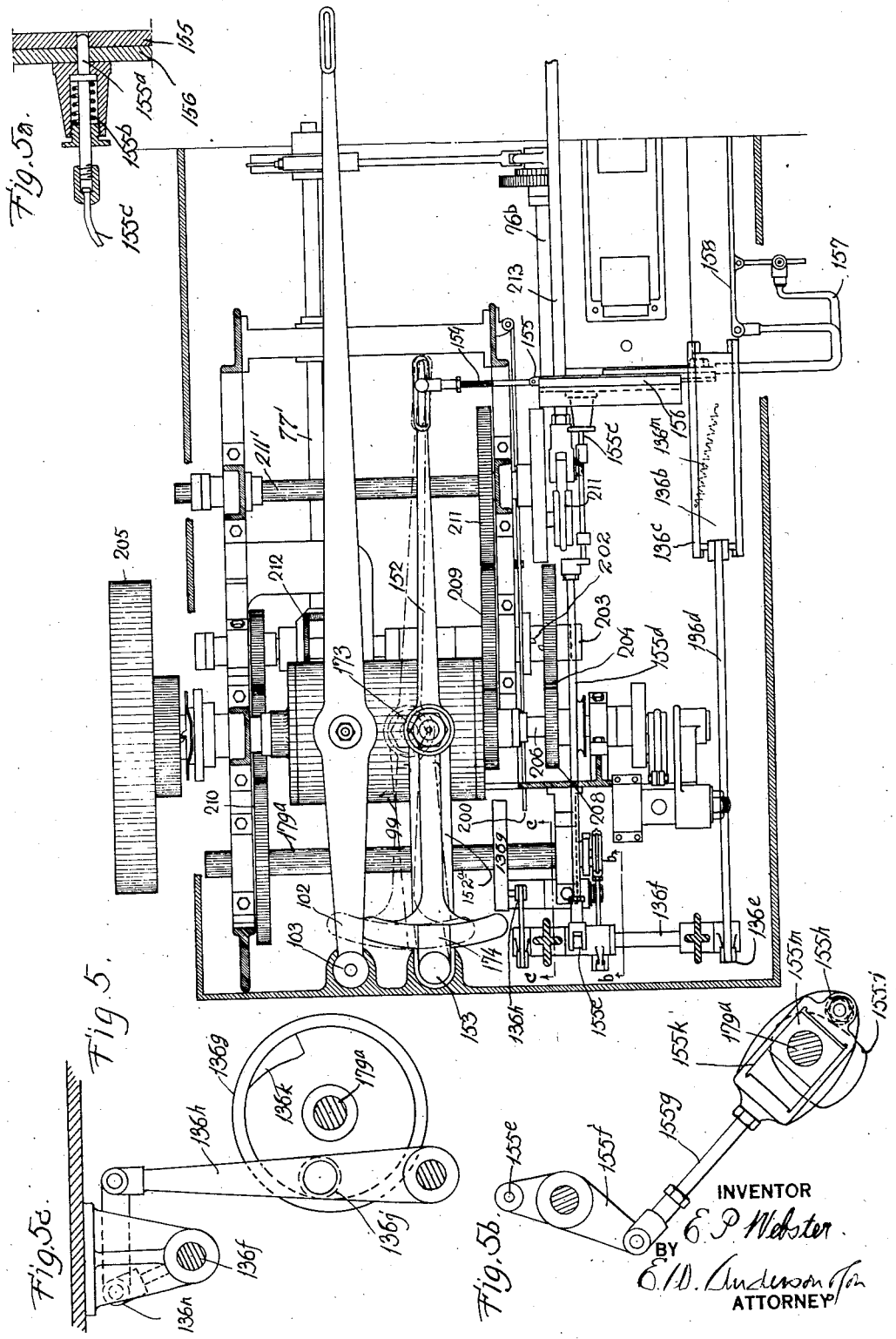
INVENTOR
E. P. Webster
BY
E. D. Anderson
ATTORNEYS

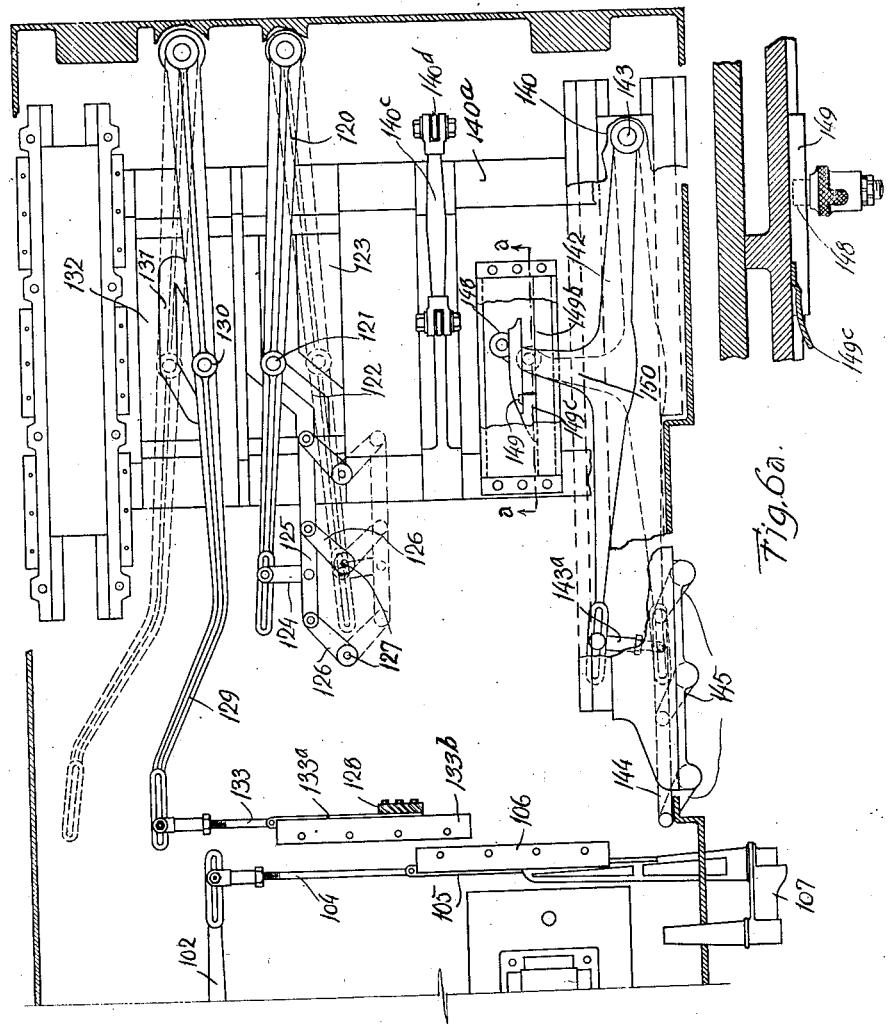

July 13, 1926.
E. P. WEBSTER
1,592,794
MACHINE FOR PACKING BISCUITS
Original Filed Oct. 9, 1922    22 Sheets-Sheet 8
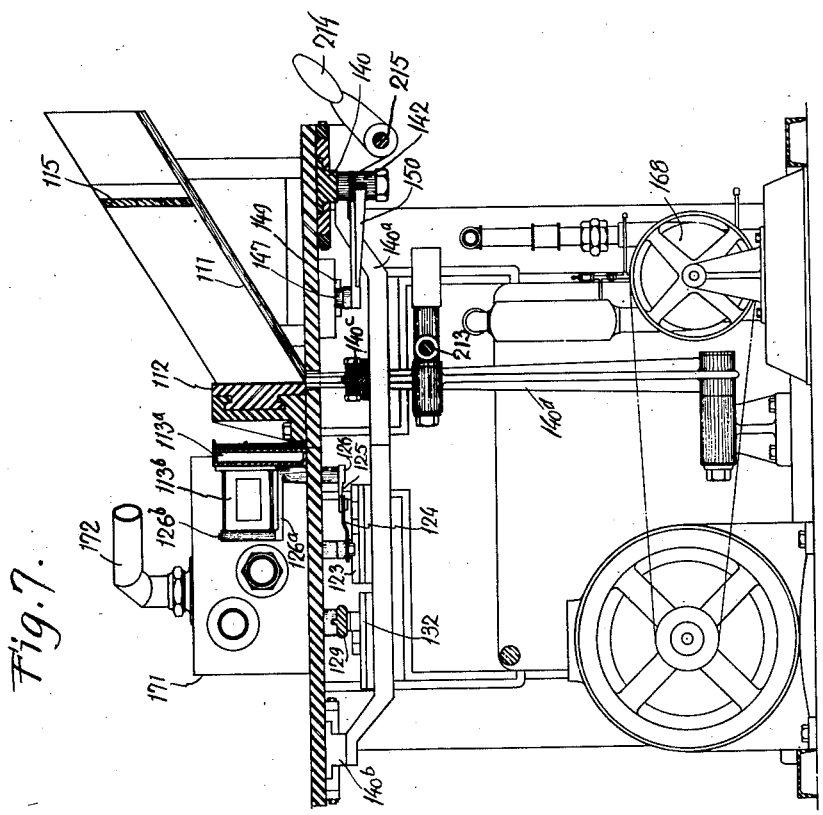
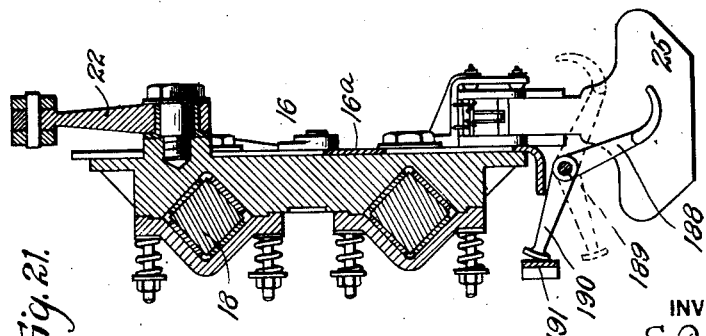
INVENTOR
E. P. Webster
BY
E. D. Anderson
ATTORNEYS

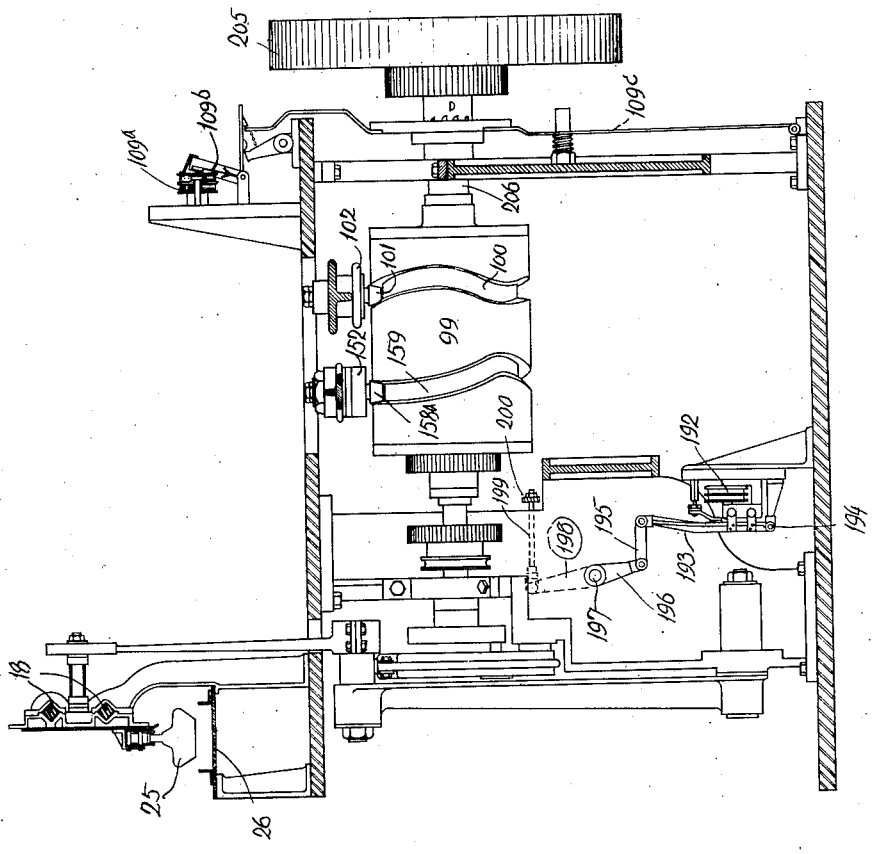

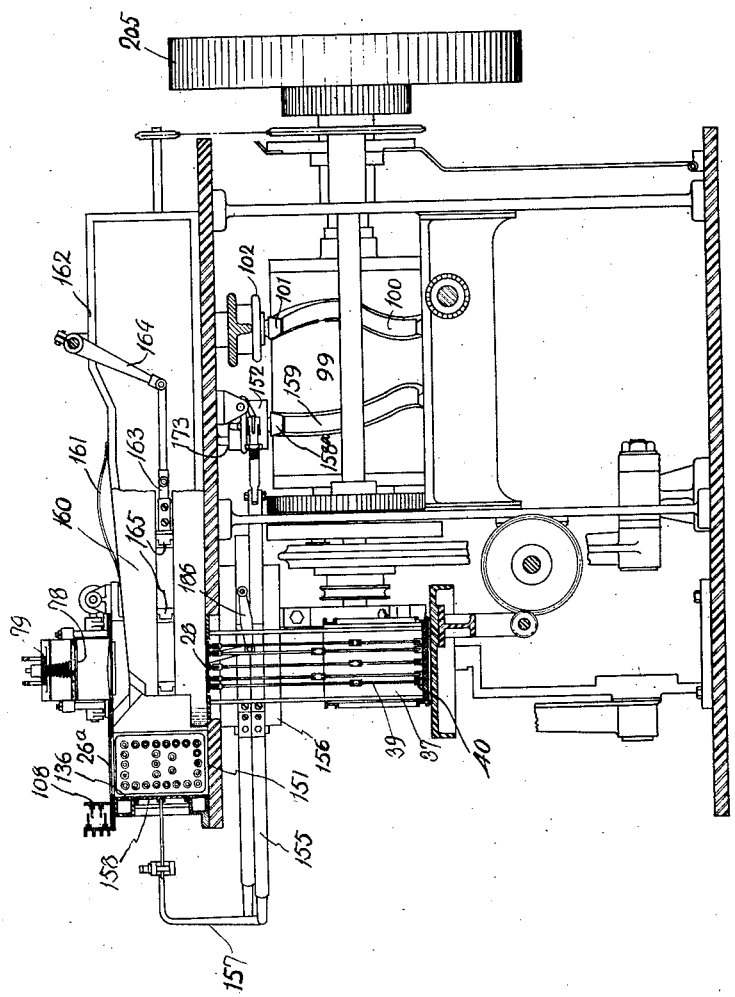

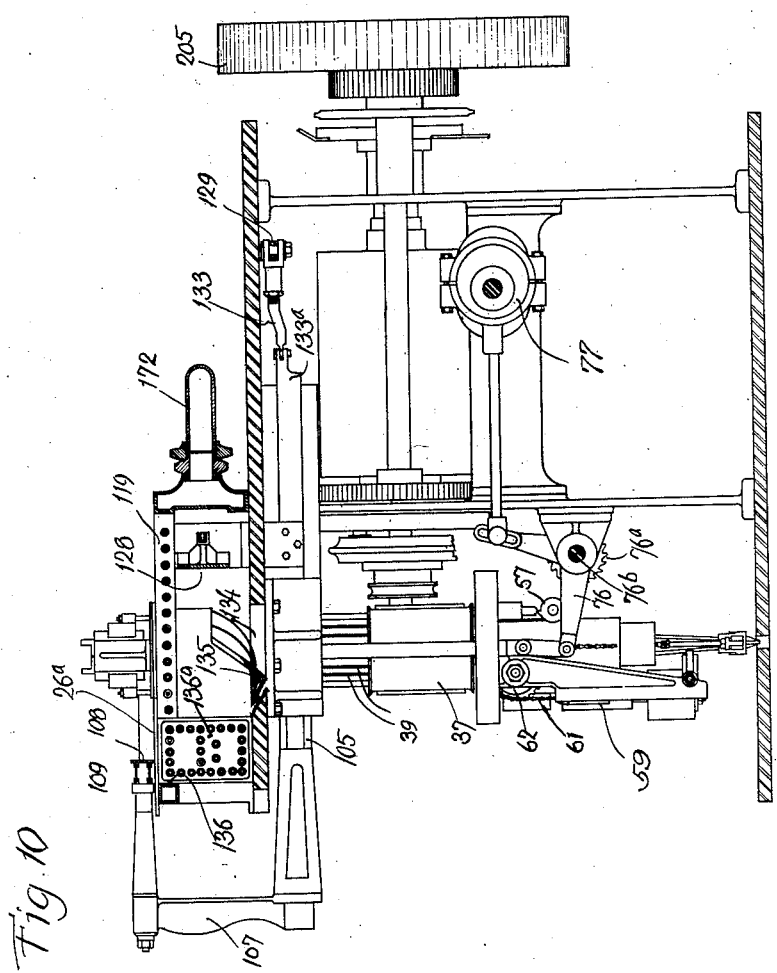

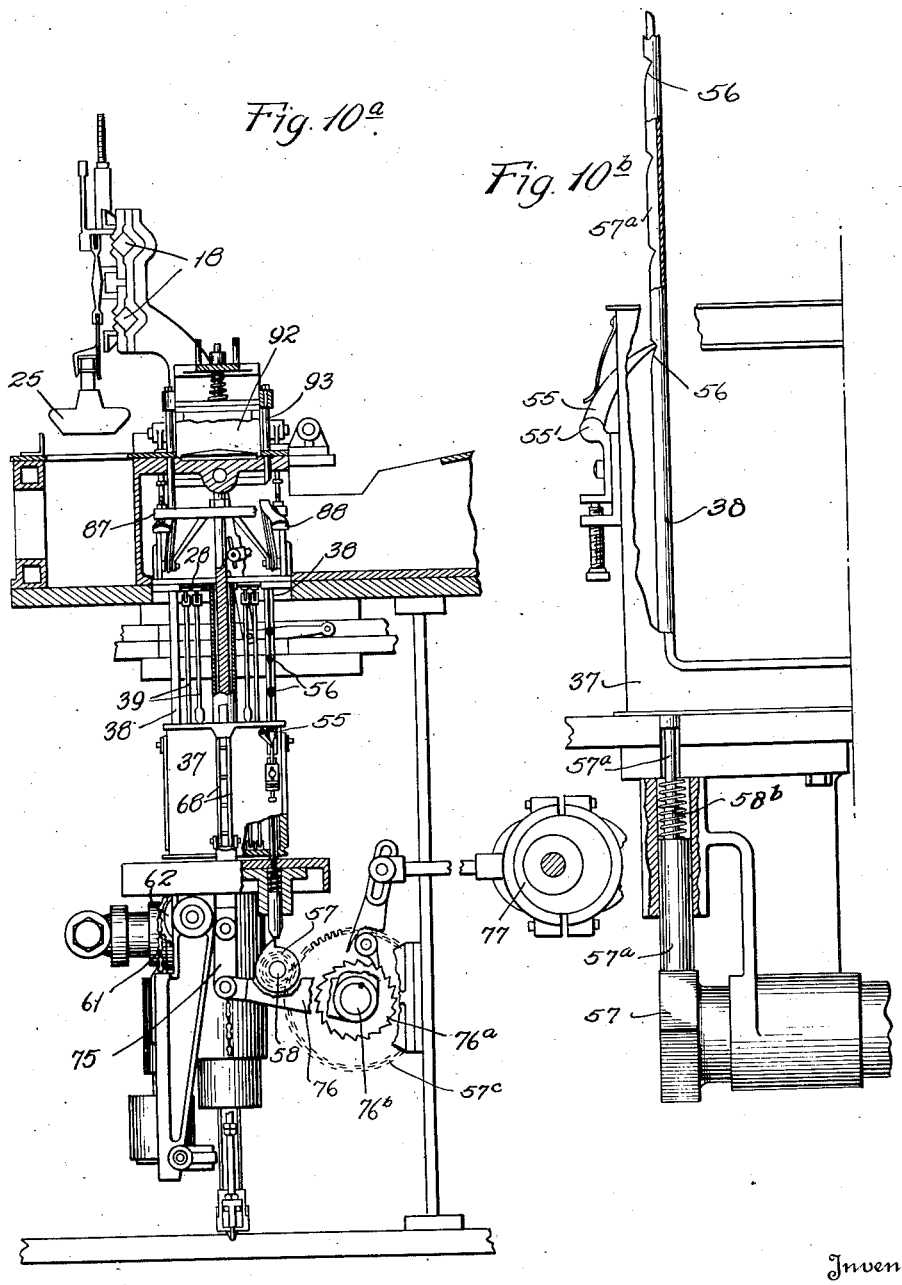

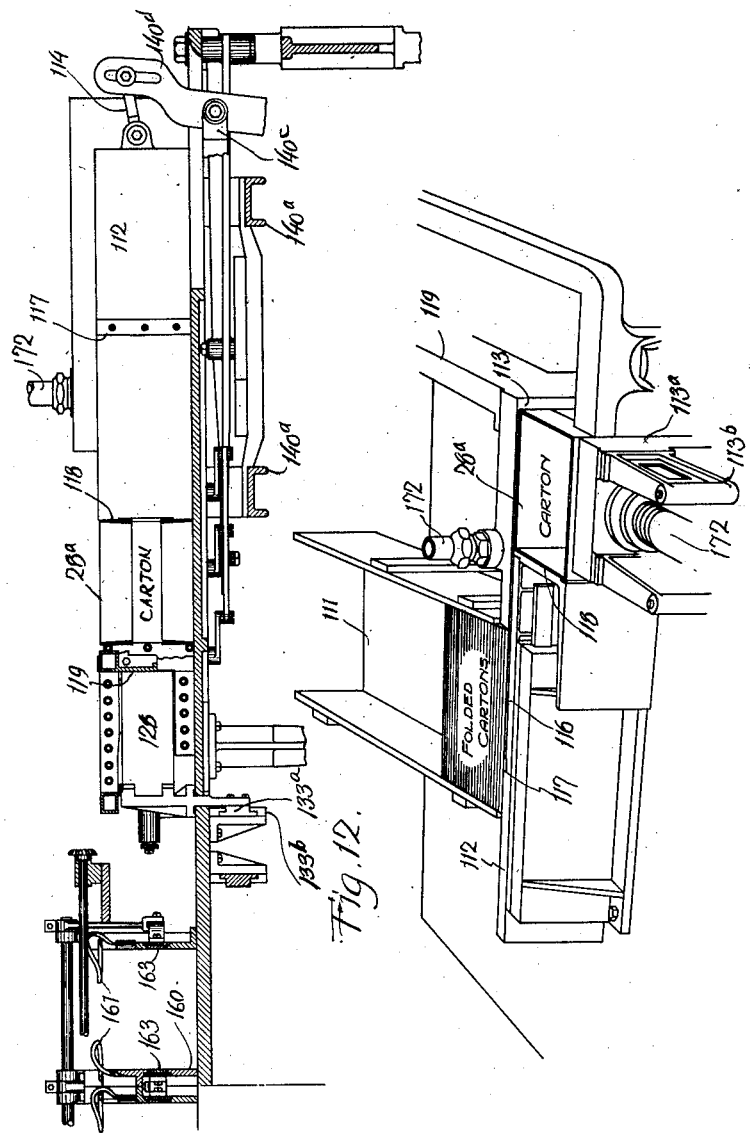

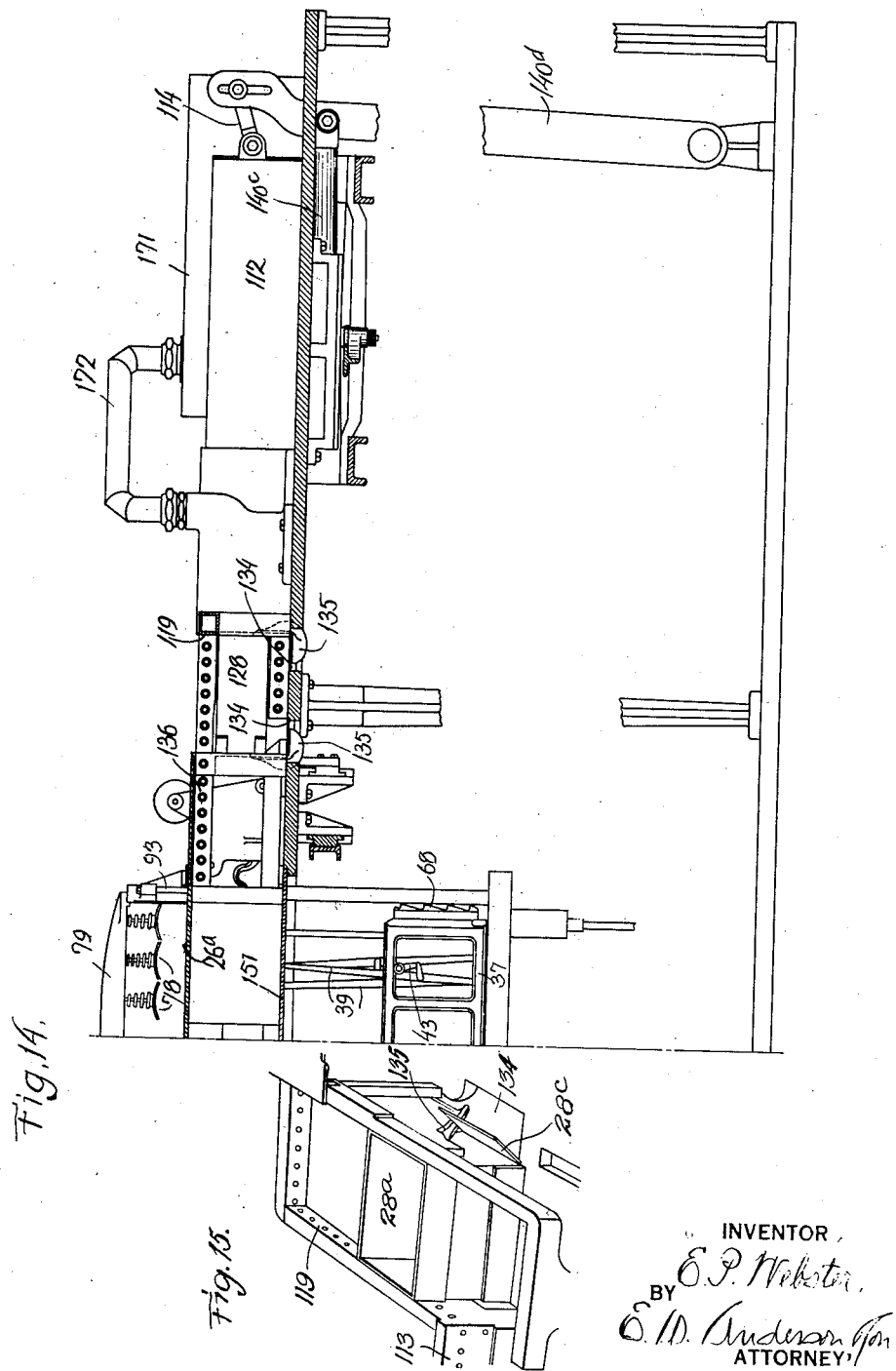

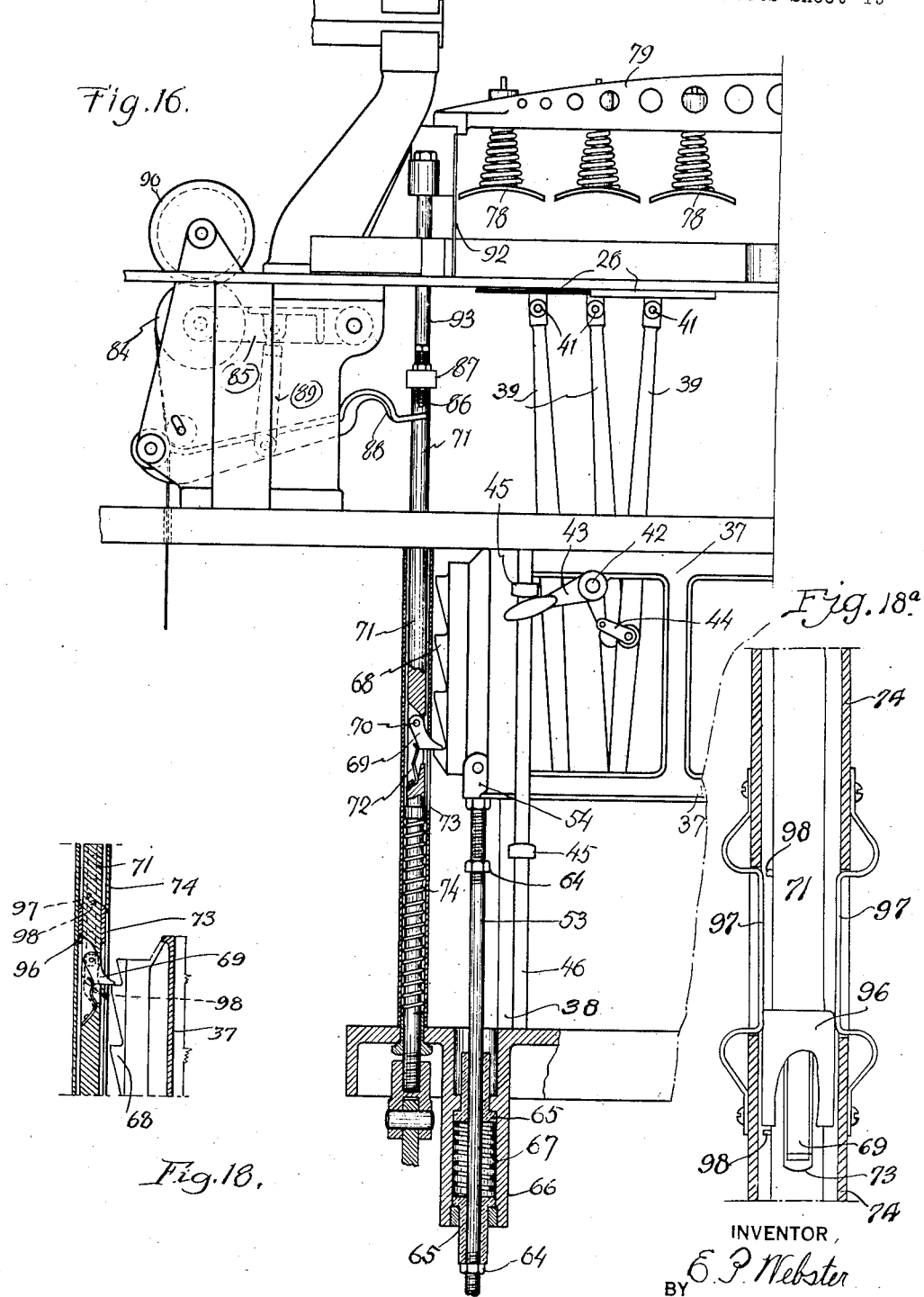

July 13, 1926.
E. P. WEBSTER
1,592,794
MACHINE FOR PACKING BISCUITS
Original Filed Oct. 9, 1922    22 Sheets-Sheet 16
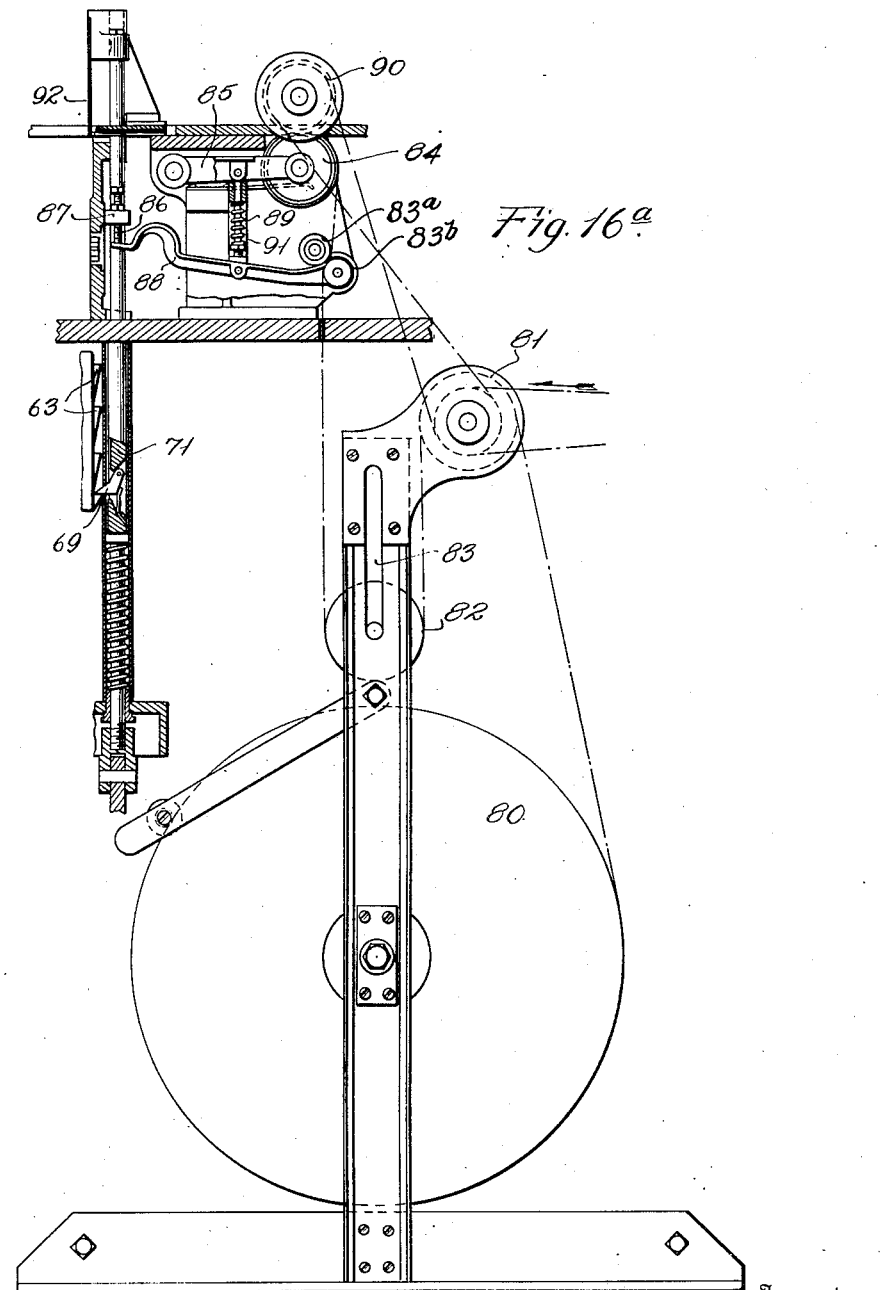
Fig. 16.ᵃ
Inventor
E. P. Webster
By E. W. Anderson
Attorneys

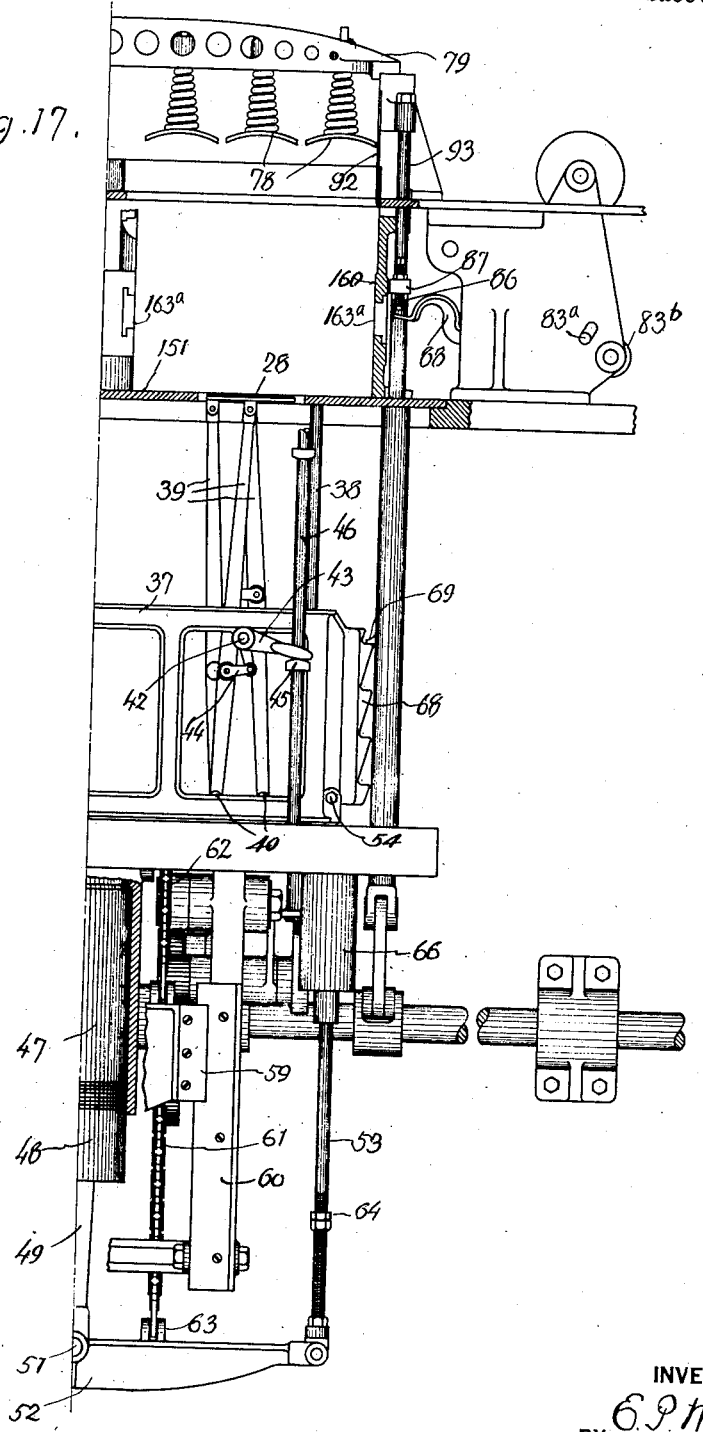

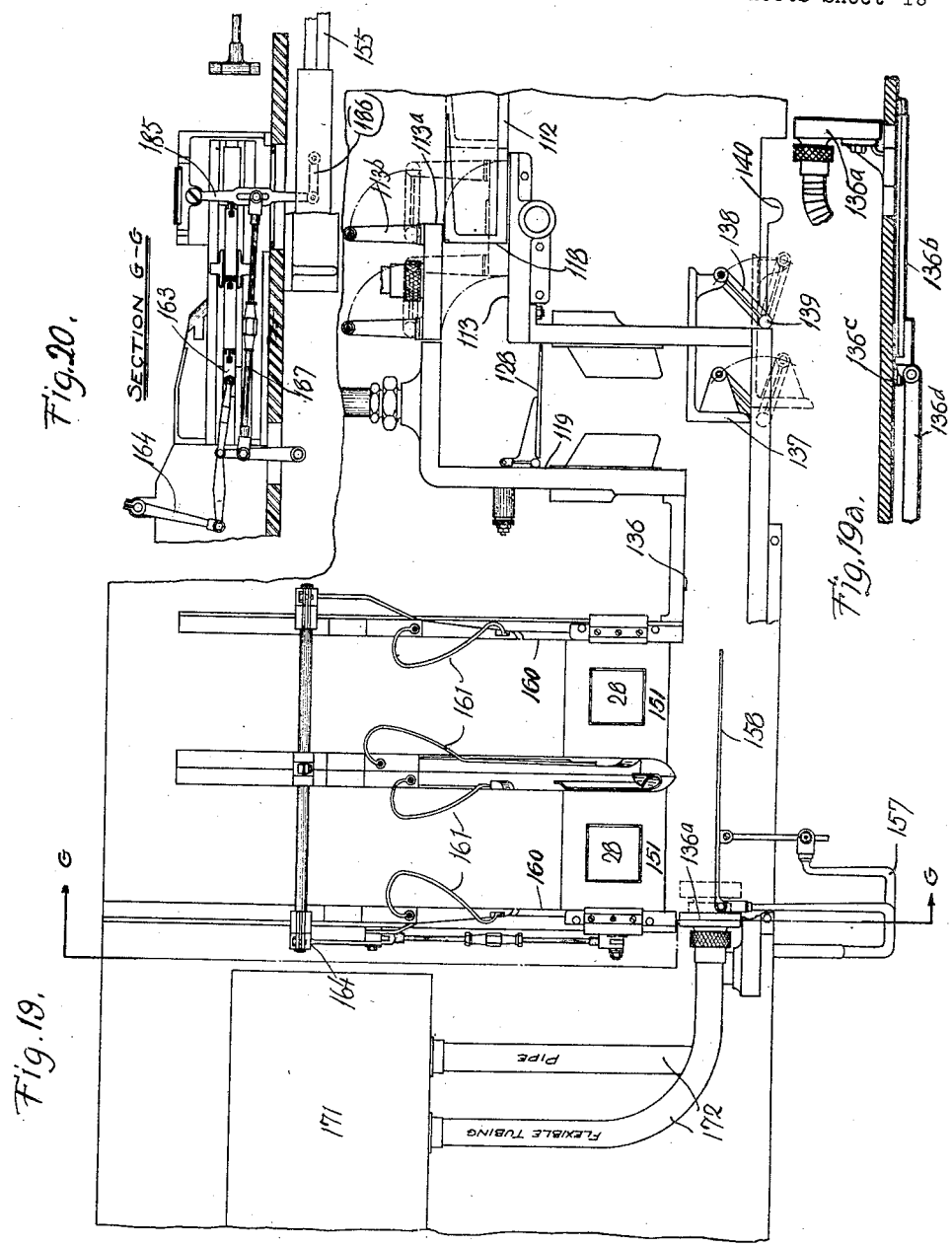

July 13, 1926.

E. P. WEBSTER

MACHINE FOR PACKING BISCUITS

Original Filed Oct. 9, 1922   22 Sheets-Sheet 19

1,592,794

INVENTOR
BY E. P. Webster.
E. W. Anderson
ATTORNEYS

July 13, 1926.
E. P. WEBSTER
1,592,794
MACHINE FOR PACKING BISCUITS
Original Filed Oct. 9, 1922    22 Sheets-Sheet 20
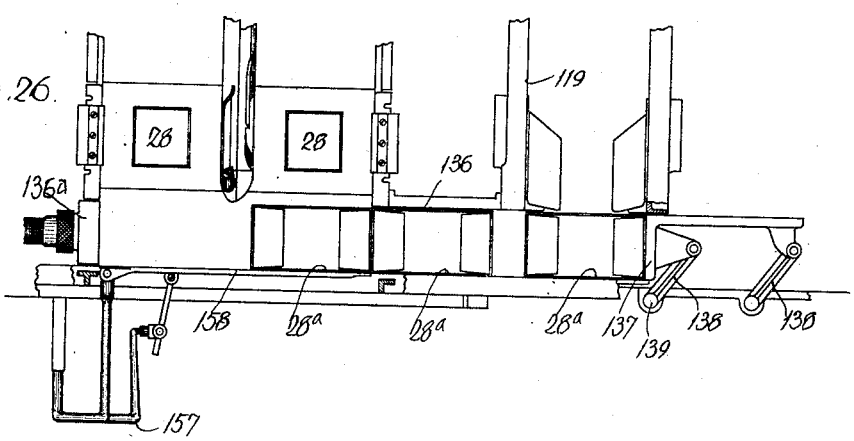
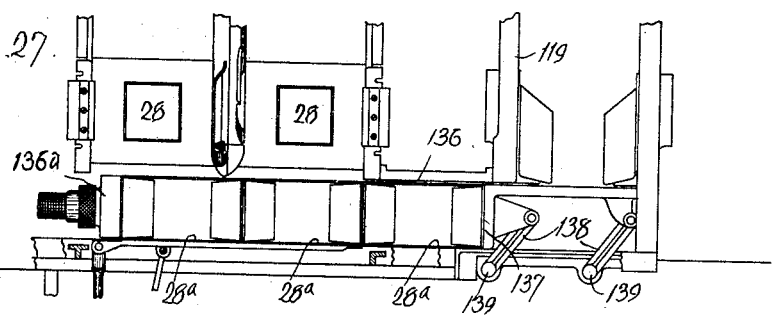
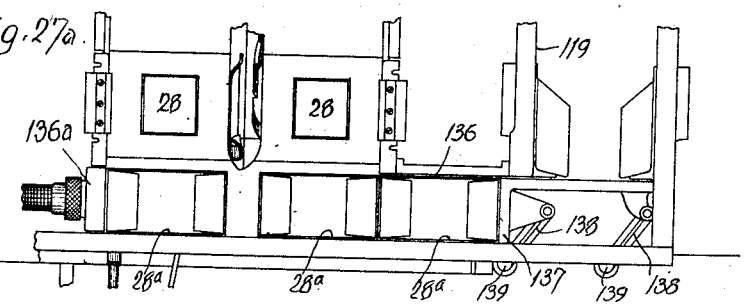
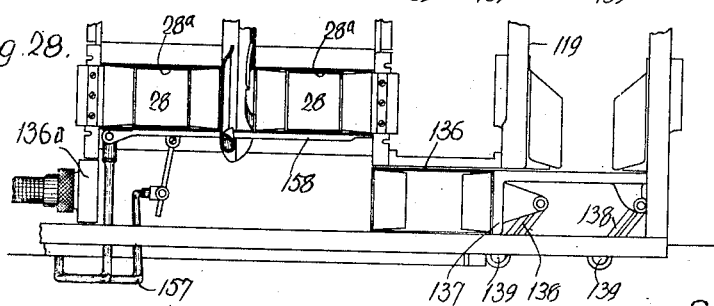
INVENTOR
E. P. Webster.
BY
E. W. Anderson Jr.
ATTORNEYS

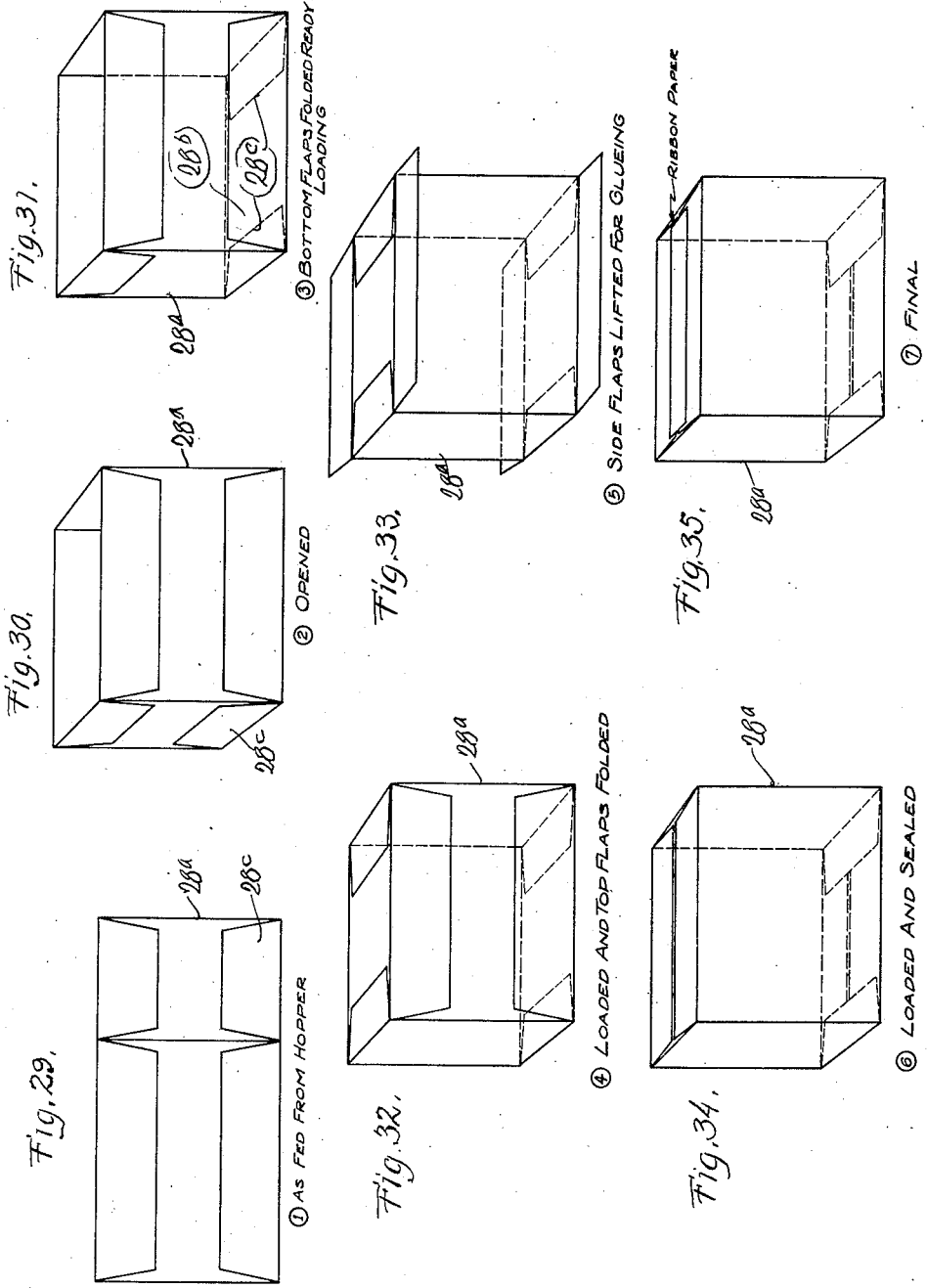

July 13, 1926. 1,592,794
E. P. WEBSTER
MACHINE FOR PACKING BISCUITS
Original Filed Oct. 9, 1922 22 Sheets-Sheet 22
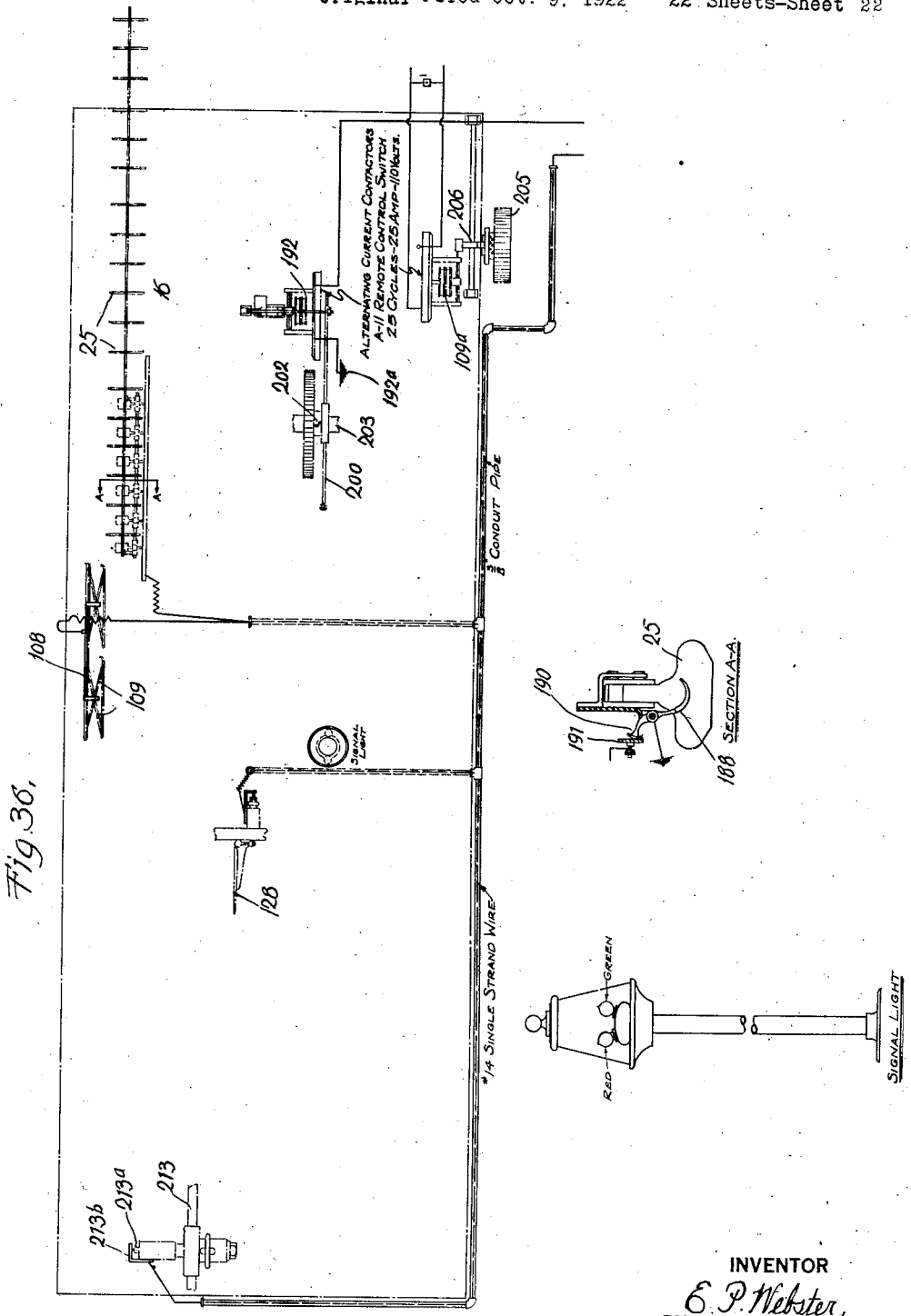
INVENTOR
E. P. Webster,
BY
E. W. Anderson
ATTORNEY Patented July 13, 1926.

1,592,794

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

MACHINE FOR PACKING BISCUITS.

Application filed October 9, 1922, Serial No. 593,335. Renewed May 11, 1926.

This invention relates to apparatus for the production and packaging of food products, and has to do more particularly with a machine for packing these products in cartons. This machine is intended to be used in association with other devices for producing the articles and baking them in a continuous operation, and the packing mechanism of this invention is arranged to remove the articles from a conveyor on which they have been carried through a baking oven, to deliver these articles to a packing station, to fill cartons successively with the articles, and to remove the filled cartons and replace them by empty ones. The machine also includes means for feeding cartons in a flattened condition from a supply, opening these cartons, and delivering them one after another to the point at which they are to be filled.

The present machine is especially adapted for the packaging of food products of a fragile character, such as shredded wheat biscuits which, after being baked, have a delicate structure and must be handled with care in order to avoid injury in the packing operation. An adaptation of the invention suitable for this purpose will accordingly be described, but it is to be understood that the invention is not limited in its utility to this particular type of product.

In the continuous manufacture of shredded wheat biscuits, the grain, after a preliminary cooking treatment, is acted upon by shredding devices which deposit a continuous strand made up of individual filaments upon a conveyor. This strand is subdivided, while in movement on the conveyor, into individual biscuits, and these biscuits are deposited by appropriate devices on the pans of a conveyor. These pans extend transverse to the conveyor and each pan contains a single row of biscuits. The conveyor carries the unbaked biscuits through an oven, where they are subjected to a baking temperature and then the biscuits are passed through a drying chamber, where the moisture driven out of the shreds by the baking action is removed. From the drying chamber the biscuits are brought on the conveyor to a removal mechanism.

This removal means includes a plurality of individual blades, and in the operation of the conveyor, pans are brought succes-
sively to rest in position to be acted upon
by the removal device. The blades of the
device are moved as a unit over the pan from
which the biscuits are to be removed, then
lowered until the individual blades are in
position to engage separate biscuits of the
row. The blades are then moved as a unit
in the direction transverse to the conveyor,
and each blade pushes a biscuit ahead of it
so that a row of biscuits is transferred in
single file from the conveyor pan to a receiving platform. There are a greater number of blades in the row than there are biscuits removed from the conveyor pan at
each operation, and the file of biscuits transferred to the platform in the first operation
is moved across the platform in successive
steps by the blades of the removal device, a
group of biscuits eventually being placed
in front of a feeding device, which operates
in timed relation to the removal mechanism
and feeds the biscuits to the packing station.

At this station the cartons are advanced
successively to a position to be filled and
two cartons are packed simultaneously. A
group of biscuits is fed by the feeding device to a biscuit supporting platform, which
is inserted through the open bottom of each
carton and rises to the level of the top
thereof. The first group of biscuits forming
a layer in the carton is moved upon this
platform and the latter is then dropped
down a step and another layer of biscuits
placed in position over the first. These operations continue until the carton is filled,
when the filled carton is ejected and a new
one placed in position. The use of this platform for lowering the biscuits into the carton is necessary in order to avoid damage to
the fragile biscuits. Strips of paper are also
placed beneath each layer of biscuits in the
cartons, these strips of paper separating
the adjacent layers and preventing injury
to the biscuits from rubbing.

For a better understanding of the invention, reference will be made to the accompanying drawings, in which—

Figure 23:
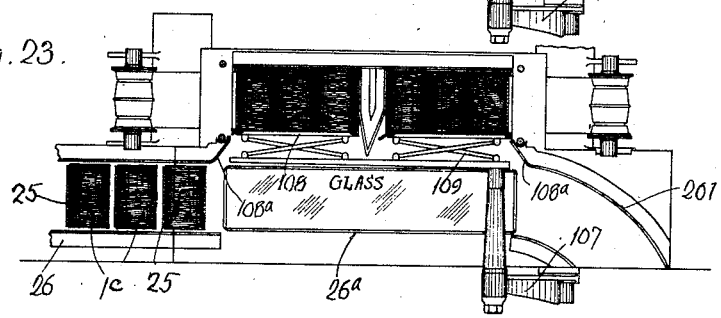
Figure 24:
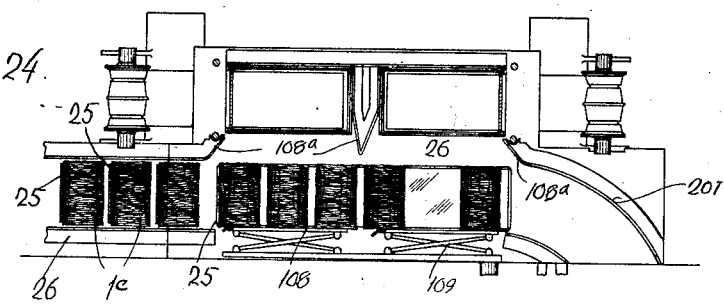
Figure 25:
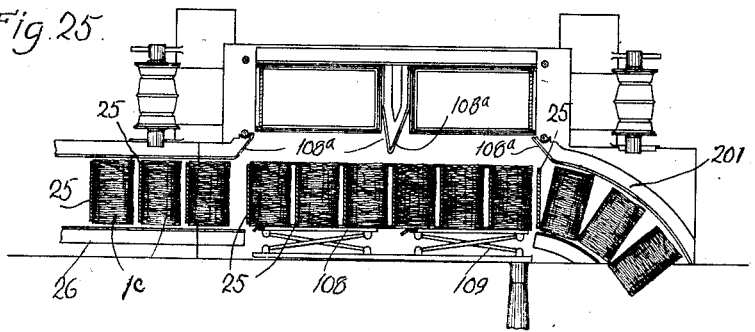

Fig. 1 is a side view of the biscuit removal means, with a portion of the packing
machine, certain of the parts being broken
away;

Fig. 1ᵃ is a detailed sectional view of locking means for a part of the carton feeding device, Fig. 1ᵇ is a side view, partly diagrammatic, of the biscuit removal means operating to remove the biscuits from the baking conveyor from opposite sides of the same, and showing also parts of the packing machine, Fig. 2 is a side view of the right-hand part of the packing machine, being the part complementary to that part shown in Fig. 1, parts being broken away, Fig. 3 is a plan view of that part of the biscuit removal means and of the packing machine shown in Fig. 1, parts being broken away, Fig. 4 is a plan view of that part of the packing machine shown in Fig. 2, parts being removed, Fig. 5 is a plan view of the mechanism of the packing machine located below the main platform thereof and in accord with Fig. 1 disclosure, Fig. 5ᵃ is a detail sectional view of the belt for the carton feed lever member, Fig. 5ᵇ is a detail section on the line b—b of Fig. 5, Fig. 5ᶜ is a detail section on the line c—c of Fig. 5, Fig. 6 is a plan view of the mechanism of the packing machine located below the main platform thereof and in accord with the disclosure of Fig. 2, Fig. 6ᵃ is a detail section on the line a—a of Fig. 6, Fig. 7 is a section on the line A—A of Fig. 4, Fig. 8 is a section on the line B—B of Fig. 3, Fig. 9 is a section on the line C—C of Fig. 4, Fig. 10 is a section on the line D—D of Fig. 4, Fig. 10ᵃ is a transverse section of the packing machine with the plunger in fully lowered position, and parts broken away, Fig. 10ᵇ is a detail sectional view of the pawl means for preventing the plunger of the packing machine from moving upwardly except at the proper times, Fig. 11 is a section on the line E—E of Fig. 4, Fig. 12 is a detail perspective view of a portion of the carton opening and feeding means, Fig. 13 is a horizontal sectional detail view of a part of the means for ejecting the filled cartons from the machine showing two positions of the pivoted tooth, Fig. 14 is a section on the line F—F of Fig. 4, Fig. 15 is a detail perspective view of a portion of the folding means for the bottom end flaps of the carton, Fig. 16 is a detail side view of the packing machine proper, partly in section and partly broken away, the plunger being shown in fully raised position, Fig. 16ᵃ is a detail longitudinal sectional views, showing the insert paper feeder and cutter, Fig. 17 is a view similar to Fig. 16, showing other parts of the packer and the plunger being shown in fully lowered position, Fig. 18 is a detail sectional view of a modification of a portion of the means for accomplishing the downward movement of the packer plunger, Fig. 18ᵃ is a detail section taken at right angles to that of Fig. 18 and showing the springs engaging the thimble, Fig. 19 is a fragmentary top plan view of the parts shown in Fig. 4, but with parts in other positions and parts removed, Fig. 19ᵃ is a sectional detail view of the carton spacing means, Fig. 20 is a detail section on the line G—G of Fig. 19, Fig. 21 is a detail section on the line H—H of Fig. 1, Fig. 22 is a fragmentary top plan view showing certain of the biscuit feed devices and showing the biscuits, Fig. 23 is a similar view with the biscuits shown as fed into register with the packing machine plunger, Fig. 24 is a view similar to Fig. 22, with one biscuit missing, Fig. 25 is a view similar to Fig. 24, with a new group of six biscuits fed to position, Fig. 26 is a fragmentary top plan view showing certain of the carton feed devices, overlying parts being removed, Fig. 27 is a similar view with the parts in other positions, and the cartons moved into proximity to the packing machine, Fig. 27ᵃ is a view similar to Fig. 27, with the two most advanced cartons spaced apart by movement of the means for this purpose, Fig. 28 is a similar view with the two most advanced cartons moved into register with the packing machine plunger, Figs. 29, 30, 31, 32, 33, 34, and 35 show the carton in detail view respectively in flat form, opened, bottom end flaps folded, top end flaps folded, side flaps spread to horizontal position, side flaps in closed position, and with the ribbon paper seal applied, and Fig. 36 is a diagrammatic view of the several means for stopping the machine through suitable electrical connections.

Referring now to the drawings, the reference character 1 designates a baking conveyor provided with transverse pans or trays 3, each of which carries a row of biscuits 1ᶜ. The row of biscuits is deposited on the pans by appropriate mechanism and the conveyor carries the biscuits through the oven and the drying chamber, and then brings the pans of baked biscuits successively into registry with the removal mechanism or rake.

This mechanism (Fig. 1) includes a reciprocatory block 17, slidable upon guide rods 18 mounted in suitable upright members of the machine frame. The block 17 drives a main block 17ª, and the two blocks are connected by a connection which permits an initial movement of the block 17 relative to the main block in the reciprocation of the blocks in either direction on the guide rods. A rake frame 16ª has a slot and pin connection 16ᵇ with block 17ª, this connection permitting an independent relative movement of frame 16ª on block 17ª. The block 17 is connected by a link to a rock arm 19 reciprocated by appropriate mechanism and arranged to move the blocks to and fro on the slide rods 18 (Fig. 1ᵇ). The block 17ª carries bell cranks 22 connected at one end by links 23 to the block 17, and at the other end by links 23ª to the rake frame 16ª. Stop pins 24 and 25ª on the main frame 17ª determine the relative movement of block 17 to block 17ª, and in the initial movement of block 17 in one direction on the rods 18, the block moves into contact with the pin 25ª. This causes a rocking movement of the bell cranks, which moves the rake frame 16ª downwardly. In the opposite direction the relative movement of the blocks 17 and 17ª causes another rocking movement of the bell cranks, lifting the frame 16ª.

The frame 16ª carries spaced blades 25 arranged in line, and when the rake frame is moved out over the pan of the conveyor in proper position, the frame is then lowered until six of the blades enter the spaces between adjacent biscuits. On the movement of the frame away from the conveyor, these biscuits are moved off the pan upon a platform 26. It will be observed that there are eighteen blades on the frame, and in each movement of the rake, six biscuits on the conveyor are moved from the latter to the platform and twelve biscuits previously deposited on the platform are moved along the latter. The biscuits are accordingly advanced over the platform in successive steps.

The biscuits are moved over the inspection table 26 in front of the path of movement of a reciprocating member which moves the biscuits to the packing station. The mechanism by which the biscuits are moved is shown in Figs. 2, 5, 6, 9, and 10, and includes a rotary cylinder 99 provided with a circumferential cam groove 100, engaged with a roller 101 on a lever 102, the latter being fulcrumed at one end at 103 and at its other end having a connecting rod 104, connected to a slide 105 working in guides 106 mounted beneath the bed plate of the machine. This slide has an upward extension 107 and secured at its upper end is a pusher head 108.

As shown in Figs. 22 and 25, the six biscuits moved along the platform at each step are deposited in front of this pusher head which operates to advance the biscuits in groups of three to two separate cartons. The pusher head 108 is made in two sections, each of which is mounted on links 109 and these links carry contact points arranged, as will presently be described, so that any pressure placed on the sections of the pusher heads will cause a movement of the links which will cause the contact points to establish a circuit through an electromagnet, which will stop the machine. The rotation of the cam cylinder, through the connections described, causes the pusher head to be reciprocated in timed relation to the feeding mechanism, and in each movement of the pusher head six biscuits are advanced in groups of three to two separate carton filling devices.

The cartons are fed to the machine in flattened condition (Figs. 4 and 11 to 15), and these cartons have top and bottom flaps which are folded outwardly against the outer side walls of the cartons. The flat cartons are stacked in a hopper 111 against the outer face of a reciprocating head 112, which works in a guide-way 113. This head has a recess 116 in its side wall and at each reciprocation, it picks up a flattened carton and moves it out of the end of the hopper along one of the side walls of the guideway. A follower 115 keeps the cartons positioned against the side of the reciprocating head. The guide-way 113 has hollow side walls or rails and a part 113ª of the guideway is arranged for movement into the guide-way. This reciprocating part of the guide-way is also hollow with perforated walls, and is connected by a line 172 to a suction device.

When the head 112 moves forwardly, a carton at the end of the hopper is picked up by the shoulder 117 of the recess 116 and moved beyond the hopper against the side wall of the guide-way. The carton is held in position against the wall of the guide-way by suction, and when the head returns, the reciprocating member 113ª enters the guide-way and contacts with the opposed wall of the carton held in place against the guide-way wall. When the part 113ª returns, it pulls the carton wall with it, so that the carton is opened and lies in front of the face 118 of the pusher head to be moved forward by the latter in its next feeding stroke. The head 112 accordingly feeds a flat carton and the previously opened carton at each stroke. The open carton in its movement through the guide-way, is kept open by the action of the suction walls.

As the opened carton is moved forward by the end of the pusher head, it is fed to the end of the guide-way 113 into alignment with another guide-way 119 extending forwardly at right angles and also provided with perforated side walls connected to the suction chamber.

The member 113ª is moved by means of a lever 120 (Fig. 6) pivotally mounted at a convenient part of the frame and carrying a roller 121 which lies within a cam slot 122 in a cam 123 mounted on a reciprocating slide. The end of the lever is connected by a link 124 to a bar 125 connected by links 126 to vertical pins 127 which extend through the bed plate of the machine, and at their upper ends carry rock levers 126ª which are connected pivotally at 126ᵇ (Fig. 7) to extensions 113ᵇ from the member 113ª. The slide carrying the cam 123 is reciprocated by the link 140ᶜ connected to lever 140ᵈ fulcrumed at a convenient part of the machine bed and rocked by a rod 213 (Figs. 1 and 2) connected at its opposite end to a rock lever 211ª which is rocked by an eccentric pin on a disc on the shaft 211' driven through gears 211 and 209, the gear 209 being mounted on shaft 203, driven from the main drive shaft 206 by gears 204 and 208. As the cam slide reciprocates to and fro, the lever 120 is swung as shown in dotted lines in Fig. 6, and it causes the links 126 to swing about their fulcrums, this movement being transmitted to the rock levers 126ª and causing the hollow member 113ª to move across the guide-way 113 and to be retracted.

At the end of the guide-way 113 is a guide-way 119 extending forwardly at right angles, and a head 128 movable along this guide-way operates in timed relation to the action of the feeding head 112 and advances the opened carton moved in front of it by the head 112 along guide-way 119. The head 128 is reciprocated by a lever 129, fulcrumed at a convenient part of the machine frame, and carrying a roller 130 moving in a cam slot 131 in a cam slide 132 mounted to move with the cam slide 123. The end of the lever 129 is connected by a connecting rod 133 to a slide 133ª moving in guides 133ᵇ mounted beneath the bed plate of the machine. The guide-way 119 (Fig. 15) has openings 134 in its side and bottom walls through which the end flaps of the cartons, as they come into registry with the openings, swing outwardly, these flaps 28ᶜ being engaged by folders 135 and folded through an angle of 270° to a position in which they lie inwardly at the bottom end of the carton.

The opened cartons with their bottom flaps folded as described, pass along the guide-way 119 to a third guide-way 136 (Figs. 4 and 19) and at the end of this guide-way is a head 137 mounted on rocker arms 138 pivotally mounted on pins 139 mounted in an extension of the slide 140. These pins carry lever arms 145 at their lower ends connected by a bar 144 which is connected by a link 143ª to the end of a rock lever 142 pivotally mounted on the slide 140. The lever 142 has an extension 150 carrying a roller 148 which bears against a cam block 149 mounted on the under side of the bed plate of the machine. This cam block lies in close relation to a guide bar 149ᵇ and at its end the cam block has a leaf spring 149ᶜ. As the slide 140 is reciprocated by its connection with the link 140ᶜ, the roller 148 is caused to travel around the block 149 and in such movement it rocks the lever 142, causing a swinging movement of the head 137. The head 137 mounted on the end of the slide 140 accordingly is reciprocated to and fro, and prior to its forward movement it is moved up into a position to engage a carton in the end of the guide-way 119. It advances this carton along the guide-way 136 and at the end of its reciprocation the head is swung out of the way of the cartons being advanced along the guide-way 119 by the head 128.

The slide 140 is connected by transverse frame members 140ª with a similar slide 140ᵇ at the opposite side of the machine (Fig. 7). On this frame are carried the slides 123 and 132, all these slides being moved by the rock lever 140ᵈ as described.

The cartons are advanced in succession along the guide-way 136 with their end walls in contact, and the two leading cartons are eventually moved in front of a pusher member which advances them to the packing stations. Two cartons are filled simultaneously, and as the packing devices for the two cartons are necessarily separated, the cartons fed with their ends in contact must similarly be separated. For this purpose there is provided a suction chamber 136ª (Fig. 10) which forms the end wall of the guide-way 136 and is hollow with a perforated face. This chamber is connected by a pipe 172 to the suction chamber 171 and it is moved inwardly against the end of the first carton in the row and then retracted, pulling this carton with it, thus spacing the two end cartons by the required distance. The head is moved by its connection with a slide 136ᵇ moved in guide-ways 136ᶜ by a lever 136ᵈ connected by a link 136ᵉ to a rock shaft 136ᶠ (Figs. 5, 5ᶜ, 19, 19ª). This shaft is connected by linkage to a lever 136ʰ carrying a roller 136ʲ which bears against the inner face of the rim of a disc 136ᵍ on the rotating shaft 179ª. The disc carries a projection 136ᵏ which causes the lever 136ʰ to be rocked, moving the slide 136ᵇ with a reciprocatory movement. The slide is connected to a spring 136ᵐ secured at the other end to the frame and tending to maintain the parts in normal position.

The two end cartons in line in the guideway 136 having been separated to the desired extent by the action of the suction head 136ª, are now advanced along guide-ways at right angles to the guide-way 136, upon a platform 131 (Fig. 9) slightly above the level of plunger platforms 28 when these platforms are in lowermost position. There is a platform for each carton, and when the carton has been moved into registry with the platform, the latter is raised by appropriate mechanism to the top of the carton to form a surface for receiving a group of biscuits. The cartons are moved to this position by means of a lever 152 fulcrumed at one end at 153 and at its other end having a connecting rod 154 connected to a slide 155, working in guides 156, this slide having an upward extension 157 and carrying a carton pusher head 158. The lever 152 has a roller 158ª (Figs. 5, 8, and 9) which engages in a circumferential groove 159 in the rotary cylinder 99 and is rocked as this cylinder rotates. The lever is composed of two members designated 152 and 152ª. The member 152ª is fulcrumed at one end upon a stud 153 (Fig. 1ª) and the opposite end of this part carries the roller 158ª and has an upward extension 173 upon which the member 152 fulcrums. The lever 152 is connected at one end to the link 154 and at its other end carries a T-shaped head which slides between the face of the member 152ª and the plate 174. The member 152ª carries a bolt 175 working within a slide 175ª against the tension of a spring 176, the action of which is adjustable by a nut 177. This bolt engages a seat in the lever member 152 and when so engaged the two lever members are locked together and rocked as a unit about the pivot point 153.

The cam cylinder 99 has the two grooves 159 and 100, the groove 159 actuating lever 152, and the groove 100 the lever 102, the latter being connected to the biscuit feeding mechanism. Each time the cylinder 99 makes a rotation, a group of biscuits is fed to each carton and four such feeding actions are necessary to fill the carton. Accordingly the lever 152, by which the cartons are fed, is only required to operate once for each four rotations of the cylinder and through three rotations of cylinder 99 the bolt 175 is moved so as to release members 152ª and 152. When this occurs the two members are rocker relative to each other, as indicated in dotted lines in Fig. 5, without causing any feeding movement of the member 158. When the two members are locked together by the action of the bolt, the rotation of the cylinder causes the pusher head 158 to advance and move a pair of cartons to the filling position. The action of the bolt is controlled by a cam 178 mounted on the rotating shaft 179ª and having a depression 178ª in its rim against which bears a roller 179 in a rock lever 180 connected at its end by a link 181 which carries a yoke 182 operatively connected to the sleeve 183. This sleeve has a radial finger 184 which engages a groove in the sleeve 175ª and as the cam 178 rotates, the bolt is periodically moved to locking and unlocking position. A spring 176ª is compressed by the action of the cam and returns the sleeve 175ª and the bolt 175 to normal position.

To prevent the swinging of the lever 152 about the end of the link 154 as a fulcrum from moving the slide 155 during the times when the carton pusher head 158 is to remain at rest, there is provided a bolt 155ª extending through an opening in the guideway 156 and entering an aperture in the slide 155. A spring 155ᵇ holds this bolt in locking position, to prevent movement of the slide 155 when the two parts of the lever 152 are at rest. When the parts of the lever are locked together and slide 155 is to be moved, the bolt 155ª is withdrawn by means of a cable 155ᶜ connected to a slide rod 155ᵈ connected at 155ᵉ to a rock lever 155ᶠ pivotally mounted to a convenient part of the machine. The lever is rocked by a link 155ᵍ connected to a yoke 155ᵏ straddling a bearing block 155ᵐ on the shaft 179ª, and a cam 155ʲ on this shaft contacts with a roller 155ʰ on the yoke and causes the yoke to be reciprocated at the proper times. The movement of the yoke causes a retraction of the bolt 155ª when desired.

With the cartons in position to be filled, their bottom end flaps being turned inwardly as described, the platforms 28 are moved up within the cartons to the top thereof, and these platforms are then expanded to provide a biscuit supporting surface. The two platforms 28 are of similar construction, and but one will be described.

These platforms consist of a pair of plates mounted pivotally on the upper ends 41 of rods 39 pivoted at 40 on the frame 37. The frame carries both platforms and the two are operated in unison. The frame 37 is slidable on vertical guide rods 38 and it carries a shaft 42 having an arm 43 which abuts stops 45 on a stationary rod 46 near either end of its path of travel vertically. The shaft 42 is connected by linkage 44 to certain of the rods 39, and when the arm 43 abuts one of the stops, the shaft is rocked to cause the rods 39 to swing the platform plates together, or apart. In the lowermost position of the frame, the plates are moved together so that the platform is collapsed and the platform is thus free to enter the end of the carton restricted by the inward folding of the bottom end flaps. After the platform has been moved into the carton near the upper end of its path of travel, the arm 43 strikes the upper stop, rocking the shaft to cause the platform plates to be spread apart to provide a surface of substantially the same area as that of the carton.

The frame 37 is connected at 54 to the upper ends of vertical rods 53 connected to a cross-head 52 on which is pivoted at 51 the piston rod 49 of a piston 48 in a vacuum cylinder 47 connected by a pipe to a suction device. The suction tends to lift the piston at all times, forcing the frame to its uppermost position. The frame is prevented from being moved upwardly except at the proper times by spring-pressed pawls 55 (Figs. 10ª, 10ᵇ) pivoted on the frame at 55′ and engaging successive teeth 56 on the vertical rods 38. Within the rods 38 are reciprocatory strips 57ª having notches corresponding to the teeth 56, and these notches are normally in registry with the teeth. When the frame is to be moved upwardly, the cams 57 upon the shaft 58 raise the strips 57ª, displacing the notches in these strips from registry with the teeth 56. The pawls 55 are thus forced out of engagement with the teeth, and the frame 37 is free to be lifted. The strips are returned to normal position by springs 58ᵇ acting on rods 57ª riding on the surface of the cams 57 having gear connection 57ᶜ with a ratchet wheel 76ª loose upon a shaft 76ᵇ on which is fulcrumed the rock lever 76.

The plunger frame is provided with a counterweight 59 movable in guides 60 and suspended by chains 61 which pass around pulleys 62 and are connected with the cross-head at 63. The platforms are moved downwardly with a step by step movement after the successive layers of biscuits are placed on them, and this movement is accomplished by means of rack teeth 68 on either end of the frame, each rack being engaged by a pawl 69 pivoted at 70 on a vertically reciprocatory rod 71, the pawl being projected by a spring 72 through a slot 73 of a sleeve 74, within which the rod 71 is mounted. The rod 71 has a link connection 75 with the rock lever 76 operated by an eccentric 77 on a driven shaft 77′ driven from the shaft 203 by beveled gearing 212. As the shaft 77′ rotates, the rock lever 76 reciprocates the vertical rods 71, and at each reciprocation the pawls engage teeth on the racks and move the plunger frame downwardly by a single step. At the end of each downward step, the frame is held against upward movement by the pawls 55 until the complete downward movement in four steps has been accomplished, whereupon the pawls 55 are rendered inoperative and the frame is moved to uppermost position.

In the modified construction illustrated in Figs. 18 and 18ª, the rod 71 carries a thimble 96 slidable thereon and disposed between the rod and the sleeve 74. Leaf springs 97 carried by the sleeve engage the thimble through slots in the sleeve and the rod has upper and lower stop pins limiting the movement of the thimble. In starting the downward stroke of the rod, the thimble is held against movement by the springs 97 and the pawl moves out from beneath the thimble and is at once projected from the slot in the sleeve. In the upward movement, the thimble is held by the springs against movement with the rods 71 until the thimble is engaged by the lower stop pin. The pawl 69 is thus carried beneath the end of the thimble and drawn inwardly out of engagement with the rack teeth by the action of the thimble. The thimble is held by the springs against movement with the rod 71 until engaged by either stop pin 98 and the relative movement of the rod and the thimble is sufficient to withdraw and release the pawl, as described.

When the biscuits have been delivered in groups of three to a position over the packing platforms 28, and these platforms moved downwardly, displacement of the biscuits is prevented by spring cushioned pads 78 on the upper cross-head 79 (Fig. 17) which is carried on posts 93 secured to a cross-head 87 mounted on the rods 71. As each platform moves down, therefore, the biscuits are held resiliently in position on the platform or on the biscuits in the layers beneath them by the action of the pads.

Paper strips are inserted into each carton between adjacent layers of biscuits in the packing of the cartons, by identical mechanism. This mechanism includes a roll 81 over which the paper passes from a supply roll 80, being then led around a take-up roll 82 mounted movably in bearings 83. From the take-up roll, the paper passes between brake rolls 83ª, 83ᵇ, between rolls 84 and 90, and thence is led horizontally over the top of the carton in position at the filling station. The roll 84 is mounted in pivoted arms 85 connected through a spring 91 to link 89 which is connected to a rock lever 88. The end of this rock lever is in position to be engaged by a screw 86 on the cross-head 87. When the cross-head 87 is moved downwardly, the rock lever 88 moves the roll 84 away from the roll 90, which is continuously driven, and no paper is fed during the separation of rolls 84 and 90. When the rods 71 to which the cross-head 87 is connected, are moved upwardly, the springs 91 force the arms 85 to bring the two rolls 84 and 90 into contact and the paper is then fed by these rolls over the platform. During the release of the paper by rolls 84 and 90, brake rolls 83ª and 83ᵇ prevent its backward movement. The paper fed by the rolls over the top of the carton is cut by a knife 92 connected to posts 93 and movable with the cross-head 87.

When the cartons have been filled and the packing platforms withdrawn from their open bottoms, the filled cartons are ejected along a guide-way 160 (Figs. 3, 4, and 9) and during this movement the top end flaps of the cartons are turned inwardly to lie over the upper layer of biscuits in each carton by means of the flap folders 161. The folders are arranged so that the flaps at the adjacent ends of the cartons are folded one after another so that they will not interfere with each other in the folding operation. The folded flaps are held down by top plates 162 in the further movement of the cartons through guide-way 160.

The cartons are positively fed along the guide-way 160 by a reciprocatory slide 163 actuated by a connection 187 with a link 185 connected by a link 186 to the slide 155. There is a slide 163 in the outer wall of each of the guide-ways 160, and these slides are all connected together and movable in unison by connection links designated 164. The slide 163 is made in two parts capable of relative movement, and the part exposed to the wall of the guide-way is provided with a pivoted finger 165 connected to a link 166 pivoted to the other member. The arrangement of the two parts of the slide is such that when the slide is reciprocated in the feeding direction, the two parts of the slide have a slight relative movement at the beginning of each reciprocation, which causes the tooth 165 to be projected outwardly from the recess 167. The tooth accordingly engages a carton and advances it along guide-way 160. In the return movement of the slide, the initial relative movement of the two parts thereof causes the retraction of the tooth 165 into the recess so that the tooth will pass by the filled cartons in the guide-way.

In the event that the groups of three biscuits fed by the rake mechanism to a position in which they are to be moved to the cartons, are incomplete due to the absence of a biscuit, or if one or more biscuits in the group is missing, the machine operates to remove the two groups of three biscuits in position to be fed to the carton and to replace these incomplete groups with perfect groups. For this purpose, fingers 188 (Figs. 21 and 36) pivoted on a rod 189 on the rake 16 are arranged to contact with the individual biscuits of the group, each finger being swung to the dotted line position shown in Fig. 21, when the biscuit is present in perfect condition. If a biscuit is missing, the rod will swing to the full line position in which the extension 190 of the finger contacts with a plate 191. This plate, through suitable electrical connection, energizes an electromagnet 192 which operates a lever 193 by which the entire packing mechanism is brought to rest, with the exception of the feeding device. The lever 193 (Figs. 5, 8, and 36) is fulcrumed at 194 and is connected by a link 195 to an arm 196 keyed to a shaft 197 and operating an arm 198 which, through a link 199, actuates a lever 200. This lever controls a clutch 202 on a shaft 203 and, under appropriate conditions, disconnects the shaft from its driving gear 204. When the clutch is thus disconnected, the packing machine is stopped, but the rake continues in operation and on the next reciprocation of the rake the group of biscuits lying on the table 26 in position to be advanced to the cartons, is moved in a single file along the platform to the curved guide-way 201 (Fig. 25) and thence discharged from the machine, while the next complete group of biscuits is placed in position. The substitution of a group of complete perfect biscuits for the incomplete or damaged group, causes the clutch 202 to connect the shaft 203 to its driving gear, and the packing mechanism is again brought into operation.

The cartons fed from the hopper and opened by the mechanism described, are maintained in open condition by the hollow perforated side rails of the several guide-ways, and for this purpose there is provided a vacuum pump 168 which has connection 169 with a vacuum chamber 170, in turn connected to other chambers 171, which are connected by pipe 172 to the side rails.

The pans 3 of the conveyor each carry a row of twelve biscuits, and the rake is arranged to withdraw six biscuits from one end of the pan at each stroke. To remove the six biscuits from the other end of the pan, another rake, with its associated packing mechanism, is employed, the two groups of mechanism being arranged as shown in Fig. 1$^b$ with one rake arranged preferably out of alignment with the other so that the rakes remove biscuits from successive pans.

The machine is driven by a drive pulley 205 on the main drive shaft 206 which has a gear 208 driving gear 204 which may be clutched to the shaft 203. This shaft has a gear 209, meshing with a similar gear on the end of the cam cylinder 99 which is loosely mounted on the shaft 206. Gear 209 likewise meshes with a gear 211 driving shaft 211' and a pair of gears, one of which is designated 210, provides a means of driving the shaft 179$^a$ from shaft 203. With the arrangement shown, it will be seen that the clutch 203 controls the drive of all the packing mechanism, while the rake mechanism is driven by the lever 19 actuated by an eccentric block 207 on a disc on drive shaft 206.

The release of the clutch 203, therefore, has no effect on the drive of the rake, and this continues to remove biscuits from the conveyor regardless of the action of the packing mechanism. Such biscuits as are not advanced to the cartons by the packing devices, are moved to the curved guide-way 201 by the action of the rake on its next reciprocation. The action of the mechanism as described is shown clearly in Figs. 22 to 25, inclusive. The biscuits deposited in groups of three in front of the pusher heads 108 are advanced to the cartons through guides 108ª, which serve to separate the groups and to move the biscuits of each group into closer relation.

In Fig. 36 there is shown diagrammatically the various means for stopping the machine electrically, should occasion arise. In the event that there is an obstruction to the feeding of the biscuits to the loading chamber, the platforms 108 will be collapsed and these platforms carry contacts which establish an electrical circuit. If there is a biscuit damaged or missing in the group being fed to the packing mechanism, a movement of the finger 188 carried by the blade of the rake engaging the damaged biscuit, or at the point where the biscuit is absent, establishes contact with the plate 199, thereby establishing an electrical circuit. If there is an obstruction to the feed of the cartons by the member 128, suitable contacts are brought into operation, which establish an electrical circuit. Any failure of the mechanism which obstructs the movement of the rod 213 moving the cam slide and other associated parts will cause a movement of the rod which will result in a pin 213ª being pushed out of contact with the strip 213ᵇ. This establishes an electrical circuit, and each of the circuits above mentioned is arranged so as to energize the electromagnet 192, which causes the disconnection of the clutch 202, thereby stopping all of the mechanism except the rake. An electromagnet 109ª (Fig. 8) operates a lever 109ᵇ to release a spring-pressed lever 109ᶜ which controls the clutch on the main drive shaft of the machine and the energization of the electromagnet is controlled by contacts actuated by a handle 214 on the front of the machine mounted on a rock shaft 215 suitably connected to the movable contact of the pair. The operation of the handle 214 stops the entire machine.

I claim:

1. In a machine for packing biscuits, a conveyor, a plurality of packing machines including each means for successively feeding cartons, and means for removing successive transverse rows of biscuits from said conveyor and delivering the same in successive rows to the cartons of the packing machines including devices operating along different paths and adapted to simultaneously remove each a portion of a transverse row of biscuits from said conveyor.

2. In a machine for packing biscuits, a conveyor, a plurality of packing machines located upon opposite sides of said conveyor and including each means for successively feeding cartons, means for removing successive transverse rows of biscuits from said conveyor and delivering the same to the cartons of the packing machines including horizontally reciprocating rake heads operating along different paths and in opposite directions transversely of said conveyor and adapted to simultaneously remove from opposite sides of said conveyor each a portion of a transverse row of biscuits.

3. In a machine for packing biscuits, a conveyor, platforms, and means for removing successive transverse rows of biscuits from said conveyor and including devices operating along different paths and adapted to simultaneously remove each a portion of a transverse row of biscuits to and upon the related platform, in combination with a plurality of packing machines each related to a biscuit removal device and including means timed therewith for successively feeding cartons and for removing the biscuits from the platform and delivering the same successively to said cartons.

4. In a machine for packing biscuits, a conveyor, means for moving the same intermitently, platforms upon opposite sides of said conveyor, and horizontally reciprocating means operating transversely of said conveyor during the stoppages consequent upon the intermittent movement thereof for removing successive transverse rows of biscuits and including rake heads operating along different paths and in opposite directions and adapted to simultaneously remove from opposite sides of the conveyor each a portion of a transverse row of biscuits to and upon the related platform, in combination with a plurality of packing machines located upon opposite sides of the conveyor and each related to a rake head and a platform and including means timed with the biscuit removal means for successively feeding cartons and for removing the biscuits from the platform and delivering the same to the cartons.

5. In a machine for packing biscuits, a conveyor, means for successively feeding cartons, means for removing biscuits successively from said conveyor and delivering the same to said cartons, and means for ejecting the filled cartons including a slide and a pivoted tooth carried thereby.

6. In combination, a guide-way for cartons, reciprocating means for feeding unfilled cartons therethrough, means for feeding articles into the cartons, and reciprocating means for feeding the filled cartons from said last-mentioned means, comprising movable fingers adapted to enter behind the individually filled cartons upon forward reciprocatory movement to feed the filled cartons, and to be removed therefrom upon rearward reciprocatory movement.

7. In combination, a guide-way for cartons, reciprocating means for feeding unfilled cartons therethrough, means for feeding articles into the cartons, reciprocating means for feeding the filled cartons from said last-mentioned means, comprising a bar disposed at each side of the row of cartons, means cooperatively connecting said bars to the reciprocating means for the unfilled cartons, whereby said bars are reciprocated simultaneously with said reciprocating means, and means carried by said bars for feeding the filled cartons.

8. In combination, two parallel guide-ways for opened cartons, means for feeding the cartons in pairs through said guide-ways into article-filling position, means for feeding articles into position above the opened ends of the cartons, and means for feeding the articles downwardly therein, comprising a support adapted to be raised and lowered, a pair of collapsible platforms, each consisting of telescoping sections pivoted arms supporting the telescoping sections upon the support, and means cooperating with the arms adapted to expand the platforms into the respective cartons, as the support is moved to its raised position, and to contract the platforms as it is moved to its lowered position.

9. In combination, two parallel guide-ways for opened cartons, means for feeding the cartons in pairs through said guide-ways into article-filling position, means for feeding articles into position above the opened ends of the cartons, and means for feeding the articles downwardly therein, comprising a support adapted to be raised and lowered, a pair of collapsible platforms, each consisting of telescoping sections, pivoted arms supporting the telescoping sections upon the support, levers connecting the arms of the respective platforms, and abutment means cooperating therewith, adapted to expand the platforms in the respective cartons, as the support is moved to its raised position, and to contract the platforms as it is moved to its lowered position.

10. In combination, a guide-way for opened cartons, means disposed in relation to the guide-way for feeding successive layers of articles into the cartons, means for feeding the cartons through the guide-way into relation with said feeding means, means for feeding a plurality of layers of the articles into feeding relation with the cartons during a single feeding movement of the cartons, means for operating said carton-feeding means and said article feeding means, comprising a single rotating cam having two cam grooves, means actuated by one cam groove for feeding the articles, means actuated by the other cam groove for feeding the cartons, and means for rendering the carton-feeding means inoperative during one of a plurality of feeding movements of the article-feeding means.

11. In combination, a guide-way for opened cartons, means disposed in relation to the guide-way for feeding successive layers of articles into the cartons, means for feeding the cartons through the guide-way into relation with said feeding means, means for feeding a plurality of layers of the articles into feeding relation with the cartons, during a single feeding movement of the cartons, a lever adapted to operate the carton-feeding means, a rotating cam for oscillating the lever, a second lever adapted to operate the article-feeding means, a cam rotatable with the first cam for oscillating said second lever, and means adapted to render said first lever periodically operative during one of a plurality of revolutions of the cams, and inoperative during the other revolutions.

12. In combination, a guide-way for opened cartons, means disposed in relation to the guide-way for feeding successive layers of articles into the cartons, means for feeding the cartons through the guide-way into relation with said feeding means, means for feeding a plurality of layers of the articles into feeding relation with the cartons, during a single feeding movement of the cartons, a lever adapted to operate the carton-feeding means, a rotating cam for oscillating the lever, a second lever adapted to operate the article-feeding means, a cam rotatable with the first cam for oscillating said second lever, said first lever comprising an arm connected to the carton-feeding means and operatively connected to the cam, a second arm having a fixed pivot and pivotally connected to the first arm at its point of connection to the cam, and means adapted to periodically lock said arms together during one of a plurality of revolutions of the cams, to render said lever operative, said lever being inoperative during the other revolutions.

13. In combination, a guide-way for opened cartons, means disposed in relation to the guide-way for feeding successive layers of articles into the cartons, means for feeding the cartons through the guide-way into relation with said feeding means, means for feeding a plurality of layers of the articles into feeding relation with the cartons, during a single feeding movement of the cartons, a lever adapted to operate the carton-feeding means, a rotating cam for oscillating the lever, a second lever adapted to operate the article-feeding means, a cam rotatable with the first cam for oscillating said second lever, said first lever comprising an arm connected to the carton-feeding means and operatively connected to the cam, a second arm having a fixed pivot and pivotally connected to the first arm at its point of connection to the cam, means adapted to periodically lock said arms together during one of a plurality of revolutions of the cams, to render said lever operative, said lever being inoperative during the other revolutions, and means adapted to be operated in timed relation to the cams, to actuate said locking means.

14. In combination, a guide-way for opened cartons having flaps, means disposed in relation to the guide-way adapted to turn over the flaps along two of the lower edges of the side walls of the cartons, a second guide-way at right angles to the first guide-way, means for feeding the cartons from the first guide-way to the second guide-way, a third guide-way at right angles to the second guide-way, means for feeding the cartons from the second guide-way through the third guide-way, means disposed in relation to the third guide-way arranged to feed articles into the cartons, and means disposed in relation to the third guide-way adapted to turn over the upper flaps along two parallel sides of the cartons.

15. In combination, two parallel guide-ways for cartons having side and end flaps, filling mechanism for simultaneously feeding articles into two cartons disposed side by side in the guide-ways, means for feeding the filled cartons through the guide-ways in relatively close relation, means disposed in relation to the outer walls of the guide-ways, adapted to fold over the outer end flaps of the cartons as they are fed through the guide-ways, and means disposed in relation to the inner walls of the guide-ways, one in advance of the other, and adapted to fold over the inner end flaps of the cartons, one in advance of the other.

16. In a machine of the character described, comprising means for successively feeding collapsed cartons, a swinging suction head for opening the cartons, suction means for holding the cartons open during their movement from the open position to filling position, and automatic means for filling the cartons.

In testimony whereof I affix my signature.

EARL P. WEBSTER.